(12) United States Patent
Kondou et al.

(10) Patent No.: US 8,233,211 B2
(45) Date of Patent: Jul. 31, 2012

(54) ELECTROCHROMIC DISPLAY DEVICE AND ITS MANUFACTURING METHOD

(75) Inventors: Yoshirou Kondou, Ibaraki (JP); Hirofumi Tanabe, Ibaraki (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 181 days.

(21) Appl. No.: 12/677,239

(22) PCT Filed: Sep. 16, 2008

(86) PCT No.: PCT/JP2008/066627
§ 371 (c)(1),
(2), (4) Date: Mar. 9, 2010

(87) PCT Pub. No.: WO2009/038033
PCT Pub. Date: Mar. 26, 2009

(65) Prior Publication Data
US 2010/0328751 A1 Dec. 30, 2010

(30) Foreign Application Priority Data

Sep. 19, 2007 (JP) ................................ 2007-242762

(51) Int. Cl.
*G02F 1/153* (2006.01)

(52) U.S. Cl. ...................................... 359/270

(58) Field of Classification Search .......... 359/265–275; 345/107, 105, 49, 84; 252/582, 586; 428/447; 546/257; 544/347
See application file for complete search history.

(56) References Cited

U.S. PATENT DOCUMENTS

| | | | | |
|---|---|---|---|---|
| 4,750,816 A | * | 6/1988 | Ito et al. .................. | 359/268 |
| 4,810,599 A | * | 3/1989 | Kondo et al. .............. | 429/323 |
| 6,795,226 B2 | * | 9/2004 | Agrawal et al. ............ | 359/265 |
| 7,436,465 B2 | * | 10/2008 | Moriya et al. ............. | 349/48 |
| 7,867,616 B2 | * | 1/2011 | Harutyunyan ............. | 428/408 |
| 2002/0008898 A1 | | 1/2002 | Katase | |
| 2003/0192585 A1 | * | 10/2003 | Beckenbaugh et al. ...... | 136/263 |
| 2007/0064303 A1 | | 3/2007 | Schumacher et al. | |

FOREIGN PATENT DOCUMENTS

| | | |
|---|---|---|
| JP | 63 225688 | 9/1988 |
| JP | 3 132724 | 6/1991 |
| JP | 2002 287173 | 10/2002 |
| JP | 2004 527902 | 9/2004 |
| JP | 2005 538424 | 12/2005 |
| JP | 2006 58617 | 3/2006 |
| JP | 2006 208862 | 8/2006 |

OTHER PUBLICATIONS

Extended Supplementary European Search Report dated Nov. 19, 2010 in corresponding European Application No. 08 83 2408.

* cited by examiner

*Primary Examiner* — Ricky Mack
*Assistant Examiner* — Tuyen Tra
(74) *Attorney, Agent, or Firm* — Oblon, Spivak, McClelland, Maier & Neustadt, L.L.P.

(57) ABSTRACT

An electrochromic display device including a substrate including a dividing wall and a concave portion surrounded by the dividing wall, a first conductive layer formed on a bottom surface of the concave portion, a second conductive layer formed on the dividing wall to electrically connect the first conductive layer within adjacent concave portions to each other in a predetermined direction, a third conductive layer disposed opposite to the first conductive layer, a first color-development layer and an electrolyte layer formed between the first conductive layer and the third conductive layer, and an insulating layer formed on the second conductive layer on the dividing wall.

17 Claims, 11 Drawing Sheets

ELECTROCHROMIC DISPLAY DEVICE AND ITS MANUFACTURING METHOD

TECHNICAL FIELD

The present invention relates to an electrochromic display device and its manufacturing method.

BACKGROUND ART

In recent years, the demand for material that facilitates bright full-color display with excellent color purity and with low power consumption has been increasing. For example, light-emission type elements such as CRTs, LCDs, PDPs and ELDs have such characteristics that they are bright and thereby easy to see, and therefore a number of technologies have been proposed in the past. However, above-mentioned various light-emission type elements have a problem that since the light emission needs to be directly looked at, they causes visual fatigue when viewed for many hours. Further, since mobile devices such as mobile phones are often used outdoors, there is another problem that the light emission is balanced out under sunlight and the viewability thereby deteriorates. Meanwhile, among the light-emission type elements, LCDs are the technology that has been especially growing in demand, and are used for various display applications including large and small displays. However, LCDs have a problem that the viewing angle is narrow, and thus they have problems in terms of viewability that need to be improved in comparison to other light-emission type elements.

Meanwhile, although the role of paper used for storing and conveying documents has been decreasing because of the widespread use of computers in offices, the tendency to print and read digital information in paper is still persistent when such information is perused. Therefore, the amount of paper that is temporally used and abandoned immediately after the use shows, on the contrary, an upward trend in recent years. Further, the amount of paper that is consumed daily for books/magazines/newspapers and the likes is seen as a threat in terms of natural-resources/environment, and they do not seem to decrease unless the medium is changed. However, when the way of information recognition and the way of thinking by the human being are taken into consideration, the superiority of "paper" over "display" typified by CRTs (Cathode Ray Tubes: Braun tubes) and transmission type liquid crystal displays cannot be ignored.

Therefore, the electronic paper in which the merit of paper and the merit of displays, which can directly handle digital information, are combined is expected to be put into practical use as an alternative to the paper in recent years. The necessary characteristics expected in the electronic paper include being a reflection type display element, having high reflectivity to while light and high contrast ratio, being capable of displaying with high definition, having memory effect in display, being capable of driving with a low voltage, being thin and light, being inexpensive, and so on.

The display methods of electronic paper include a reflection type liquid crystal method, an electrophoresis method, a two-color ball method, an electrochromic method, and so on. The reflection type liquid crystal method includes a G-H type liquid crystal method using dichromatic pigment, a cholesteric liquid crystal method, and so on. These methods have an advantage that they do not need to use a backlight and thus consume smaller electrical power in comparison to the light-emission type liquid crystal method. However, these methods involve the dependence on viewing angle and have low light reflectivity, and thereby have a problem that the screen inevitably becomes darker. The electrophoresis method exploits a phenomenon called "electrophoresis" in which white pigments, black toner, or the like is moved on electrodes by the effect of an electric field. The two-color ball method includes a spherical body painted with two colors such as white and black in a half-and-half fashion, and uses the rotation by the effect of an electric field. Both the methods have a merit that they consume low electrical power and that they do not involves the dependence on viewing angle. However, in these methods, it is necessary to arrange enough gaps to let particulate bodies get therein, so that they cannot be closely packed and thus making achieving a high contrast very difficult. Further, when it is to be displayed in full color, a juxtaposition mixture method using a color filter is adopted, and thus posing a problem that the reflectivity decreases and the screen inevitably becomes darker.

The electrochromic method exploits reversible oxidation-reduction reactions caused by an application of an electric field, and thereby their accompanying color development/disappearance. Further, electrochromic (hereinafter, simply called "EC") elements have been used in dimming mirrors of automobiles, clocks, and the likes in the past. The display by such an EC element does not require a polarizing plate and the like, does not involve the dependence on viewing angle, is a light reception type and thus superior in terms of viewability, has a simple structure, and is easily constructed in a large size. Further, it has another merit that light emission of various color tones is possible by selecting proper material.

To display in full color in an EC element, pigments capable of developing colors including cyan (C), magenta (M), and yellow (Y), which are used in subtractive color mixture, are applied. Then, by stacking C, M and Y color-development layers, a display device that can develop colors in full color is obtained by a lamination mixture method. Alternatively, by putting each of the coatings of C, M and Y color-development layers in different areas, a display device that can develop colors in full color is obtained by a juxtaposition mixture method. For example, black can be displayed by mixing colors of C, M and Y. Further, white can be displayed by bringing each pigment to a color disappearance state so that the background color becomes white. Since the EC element is a reflection type display element in which color development/disappearance is electrically repeated as described above, they are advantageous in terms of burden put on eyes and in terms of contrast.

Further, the research on material called "π-electron based conjugated polymer" as material for color-development layers has been in progress in recent years. Among the materials, ones that exhibit an electrochromic characteristic have been known, and EC elements for which a film is produced from those materials and used as a color-development layer have been also known. To display in full color by an EC element using those materials, it is necessary to adopt a structure in which C, M and Y color-development layers are stacked and to use the lamination mixture method to display in full color as described above. Alternatively, it is necessary to put each of the coatings of C, M and Y color-development layers in different areas and to use the juxtaposition mixture method to display in full color.

However, in accordance with the lamination mixture method, the overall structure of the EC element becomes complicated. Further, since the laminated body is used, loss of the light is inevitably increased due to absorption and scattering by portions other than the EC layer such as an electrode portion and a substrate portion, and thus imposing a limit to the increase in the efficiency of use of light as reflective type display elements. On the other hand, in accordance with the juxtaposition mixture method, unintended loss of the light is not caused, though it is necessary to provide division walls and to put each of the coatings of C, M and Y color-development layers in different areas. Therefore, it is possible to provide reflection type display devices capable of displaying in full color for which the efficiency of use of light is improved.

In the past, when the juxtaposition mixture method is applied, the following manufacturing method, for example, is used as a publicly-known technology. Firstly, a substrate on which a conductive layer is formed in advance is prepared, and the conductive layer is etched and thereby patterned into a desired shape. Then, division walls are provided on it by a technique such as photolithography. After that, each of the coatings of C, M and Y color-development layers is applied in different areas to manufacture an EC element. Further, in a case where a π-electron based conjugated polymer is used as the C, M and Y color-development layers, a method of forming a film by applying and drying a liquid in which a π-electron based conjugated polymer is dissolved or dispersed to a high degree, a method of forming a film by electrochemically polymerizing a π-electron based conjugated monomer, or a similar method is typically used as a conventional method of forming a film of a π-electron based conjugated polymer (see Patent Citations 1, 2, 3 and 4).

[Patent Document 1]
Japanese Unexamined Patent Application Publication No. 2002-287173
[Patent Document 2]
Japanese Unexamined Patent Application Publication No. 2006-208862
[Patent Document 3]
Japanese Unexamined Patent Application Publication No. 2006-058617
[Patent Document 4]
Published Japanese Translation of PCT International Publication for Patent Application, No. 2004-527902

DISCLOSURE OF INVENTION

Technical Problem

As described above, to create an EC element to which the juxtaposition mixture method is applied, it has been necessary to go through complicated processes such as preparing a substrate on which a conductive layer is formed in advance, etching the conductive layer, and then providing dividing walls on it by a technique such as photolithography. Further, in the applying and drying method, it has been necessary to dissolve or disperse a π-electron based conjugated polymer due to the insolubility and strong cohesive property of the π-electron based conjugated polymer even in the process of forming a color-development layer. Therefore, it has been necessary to introduce a substituent, add a surfactant, and so on, and thus increasing the number of processes and causing the decrease in the purity of the π-electron based conjugated polymer. Further, even if it is dissolved or dispersed in a solvent, it must go through the process of forming a film by applying that liquid uniformly and then drying it, and thus making the manufacturing process complicated. Furthermore, the film that is obtained through such complicated manufacturing process lacks in fineness, and therefore problems such as unevenness in color development have not been solved yet. Meanwhile, although the method of forming a film by electrochemically polymerizing a π-electron based conjugated monomer can provide a fine film, it is necessary to create a substrate, for which the film is formed by electrochemical polymerization to use the provided film as an electrochromic display device, in advance in a separate process, and thus causing the manufacturing process to be complicated.

Therefore, the present invention has been made in view of the above-described problems, and an object thereof is to provide an electrochromic display device having an excellent productivity and its manufacturing method.

Technical Solution

An electrochromic display device in accordance with the present invention includes: a substrate including a dividing wall and a concave portion surrounded by the dividing wall; a first electrode formed on a bottom surface of the concave portion; an electrical line formed on the dividing wall to electrically connect the first electrodes within adjacent concave portions to each other in a predetermined direction; a second electrode disposed opposite to the first electrode; a first color-development layer and an electrolyte layer formed between the first and second electrodes; and an insulating layer formed on the electrical line on the dividing wall. In this way, the productivity can be improved.

Further, the above-described electrochromic display device may also include a second color-development layer disposed opposite to the first color-development layer through the electrolyte layer between the first and second electrodes. In this way, it can improve the life span, the response speed, and the like of the electrochromic display device.

Further, in the above-described electrochromic display device, the first and/or second color-development layer may include a π-electron based conjugated polymer film derived from a π-electron based conjugated monomer, and the π-electron based conjugated monomer may include at least one compound selected from a group consisting of aniline; a π-electron based conjugated monomer having a structure capable of introducing boron in a principal chain; a π-electron based conjugated monomer in which part of carbon of an aromatic ring is replaced by oxygen and which is typified by pyran; a benzene derivative selected from a group consisting of 2,3-dialkyl phenyl, 2,5-dialkyl phenyl, 2,3,5,6-tetraalkyl phenyl, 2,3-alkoxy phenyl, 2,5-alkoxy phenyl, 2,3,5,6-tetraalkoxy phenyl, 2-(N,N-dialkyl amino)phenyl, 2,5-di(N,N-dialkyl amino)phenyl, 2,3-di(N,N-dialkyl amino)phenyl, p-phenylene oxide, p-phenylene sulfide, p-phenylene amino, p-phenylene vinylene, and fluorene; an acene derivative selected from a group consisting of naphthalene, anthracene, tetracene, pentacene, hexacene, heptacene, naphthylene vinylene, peri-naphthalene, amino pyrene, and phenanthrene; a carbazole derivative including N-alkyl carbazole; a pyridine derivative selected from a group consisting of pyrimidine, pyridazine, triazine, pyrazine, chinoline, and purine; a furan derivative including 3-alkyl furan; a pyrrole derivative selected from a group consisting of N-alkyl pyrrole, ethylene-3,4-dioxy pyrrole, and propylene-3,4-dioxy pyrrole; a thiophene derivative selected from a group consisting of thiophene vinylene, alkyl thiophene, ethylene-3,4-dioxy thiophene, propylene-3,4-dioxy thiophene, thienothiophene, thienofuran, thienopyrazine, and isothianaphthene; and a π-electron based conjugated compound selected from a group consisting of acetylene, oxadiazole, thiazyl, selenophene, tellurophene, imidazole, oxazole, thiazole, pyrazole, isoxazole, isothiazole, benzotriazole, pyran, benzothiadiazole, and benzooxadiazole. In this way, an electrochromic display device capable of eliminating unevenness in color development, achieving excellent contrast, resolution, and high color-developing efficiency, and having excellent display characteristics can be obtained.

In the above-described electrochromic display device, the first electrode may have total light transmittance of 70% or higher. In this way, the viewability can be improved.

Further, in the above-described electrochromic display device, the insulating layer may include at least one substance selected from a group consisting of a photo-curable resin, a thermo-setting resin, and a thermoplastic elastomer. In this way, the insulating layer can be formed speedily.

In the above-described electrochromic display device, the insulating layer may be black. In this way, the insulating layer can function as a black matrix, and thus the contrast can be improved.

Further, in the above-described electrochromic display device, the substrate may be made of at least one flexible material selected from a group consisting of polystyrene, polyacrylate, polycarbonate, a styrene-acrylate copolymer, a cycloolefin polymer, polylactic acid, polyethylene terephthalate, polyethylene naphthalate, and their derivatives.

Furthermore, in the above-described electrochromic display device, the electrolyte layer may include an ionic liquid. In this way, a high-speed response and an excellent memory property can be achieved.

The above-described electrochromic display device may also include an antireflection structure on the rear surface of the substrate. In this way, incident light can be utilized to the maximum extent, and thereby improving the viewability.

Further, in the above-described electrochromic display device, the size of the bottom surface of each of the concave portions may be $10^2$ to $5 \times 10^5$ µm$^2$; the distance of the bottom surface, when measured from edge to edge for each of the bottom surfaces, may be 15 to 450 µm; the height of the dividing wall may be 3 to 100 µm; and the ratio of the bottom surface to the dividing wall may be 0.05 to 100. In this way, the easiness in manufacturing and the image viewability are improved.

Meanwhile, a method of manufacturing an electrochromic display device in accordance with the present invention includes: a step of forming a substrate including a dividing wall and a concave portion surrounded by the dividing wall; a step of forming a first electrode on a bottom surface of the concave portion; a step of disposing a second electrode so as to be opposed to the first electrode; and a step of forming a color-development layer and an electrolyte layer between the first and second electrodes, wherein the first electrodes within adjacent concave portions are electrically connected in a predetermined direction. In this way, the productivity can be improved.

Further, in the above-described method of manufacturing an electrochromic display device, the method may also include, before the step of forming the color-development layer and the electrolyte layer, a step of forming a monomer-containing electrolyte layer including a π-electron based conjugated monomer and an electrolyte between the first and second electrodes, and the color-development layer that selectively includes a π-electron based conjugated polymer film in the first and/or second electrode may be formed by applying a voltage to the first and second electrodes and thereby electrochemically polymerizing the π-electron based conjugated monomer. In this way, the productivity can be further improved.

Advantageous Effects

In accordance with the present invention, an electrochromic display device having an excellent productivity and its manufacturing method can be provided.

| Explanation of Reference | |
|---|---|
| 1 | BASE-MATERIAL |
| 2 | DIVIDING WALL |
| 3 | CONCAVE PORTION |
| 4 | DIVIDING WALL TOP AREA |
| 5 | DIVIDING WALL SIDE AREA |
| 6 | BASE-MATERIAL TOP AREA |
| 7 | BASE-MATERIAL REAR SURFACE |
| 10 | FIRST SUBSTRATE |
| 11 | FIRST CONDUCTIVE LAYER |
| 13 | SECOND CONDUCTIVE LAYER |
| 14 | INSULATING LAYER |
| 20 | SECOND SUBSTRATE |
| 21 | THIRD CONDUCTIVE LAYER |
| 22 | WHITE-COLOR LAYER |
| 23 | SECOND COLOR-DEVELOPMENT LAYER |
| 30 | FIRST COLOR-DEVELOPMENT LAYER |
| 31 | ELECTROLYTE LAYER |

BEST MODE FOR CARRYING OUT THE INVENTION

Figure 1A:
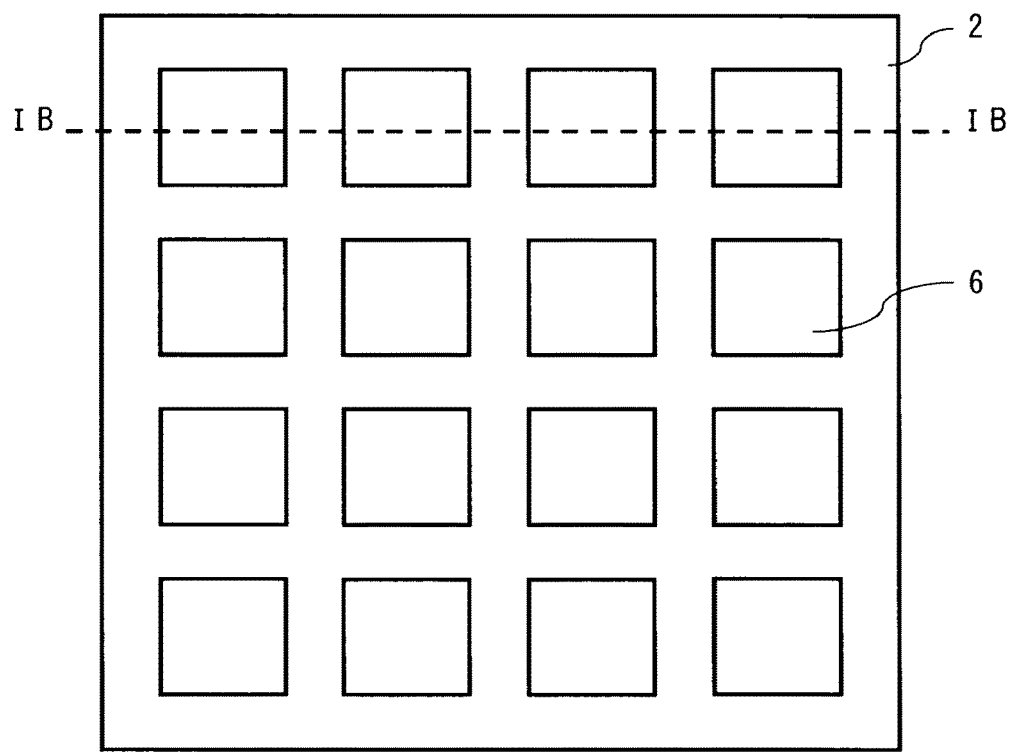
FIG. 1A is a schematic view showing a structure of a first substrate in accordance with an exemplary embodiment.
Figure 1B:
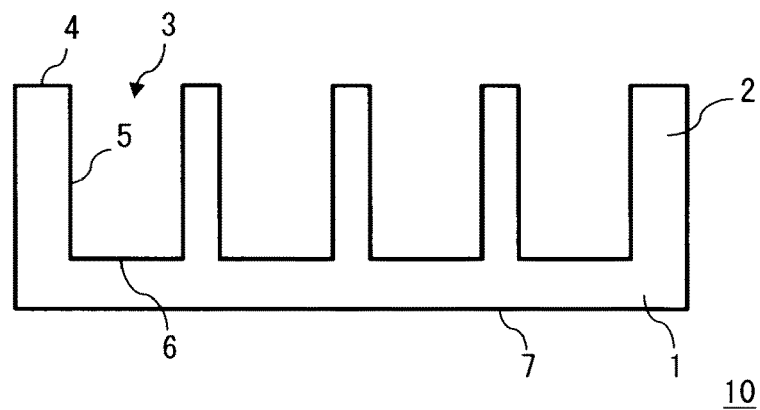
FIG. 1B is a schematic view showing a structure of a first substrate in accordance with an exemplary embodiment.

An electrochromic display device is an element in which a color-development layer(s) that exhibits an electrochromic (hereinafter simply called "EC") characteristic and an electrolyte layer(s) are formed between a display electrode(s) and an opposed electrode (s) that correspond to first and second electrodes. Further, it is a reflective type display element that repeats color development/disappearance by applying a forward/reverse voltage to the electrodes. Firstly, a first substrate on which display electrodes are formed is explained with reference to FIGS. 1A and 1B. FIG. 1A is a schematic top view showing a structure of a first substrate on which display electrodes are formed. FIG. 1B is a schematic cross-section taken along the line IB-IB of FIG. 1A.

As shown in FIG. 1B, dividing walls 2 are formed in a direction perpendicular to the base-material 1 on the first substrate 10. That is, a plurality of concave portions (opening portions) 3 each having a rectangular shape with one open side in cross-section are formed on the first substrate 10. Note that these concave shapes 3 are formed so as to correspond to the pixels of the EC display element. The first substrate 10 includes various portions, i.e., a dividing wall top area 4, a dividing wall side area 5, a base-material top area 6, and a base-material rear surface 7. That is, the bottom surface of a concave portion 3 is a base-material top area 6 and the side surface of a concave portion is a dividing wall side area 5. Further, as shown in FIG. 1A, the dividing walls 2 are formed in a lattice pattern. That is, the concave portions 3 each surrounded by the dividing walls 2 have rectangular shapes in top view, and formed in a matrix pattern. Therefore, the pixels that correspond to the concave portions 3 of the first substrate 10 are arranged in a matrix pattern.

Note that the base-material 1 and the dividing walls 2 may be integrally formed. That is, all of the dividing wall top area 4, the dividing wall side area 5, the base-material top area 6 and the base-material rear surface 7 may be formed from the same material and as an integral component having no joint portion. Needless to say, dividing walls 2 that are made of different material may be provided on the base-material 1. Publicly-known techniques may be applied as a method of integrally forming the base-material 1 and the dividing walls 2, though it is not limited to those techniques. Examples include a technique such as hot embossing using a thermoplastic resin, extrusion molding, injection molding, or glass molding. Publicly-known techniques may be applied as a method of providing dividing walls 2 made of different material on the base-material 1, though it is not limited to those techniques. For example, dividing walls 2 can be formed by a technique such as photolithography, heat hardening, or photo nano imprinting by using a photo-curable resin or a thermosetting resin on a glass or resin substrate. Alternatively, dividing walls 2 can be also formed by a technique called "micro contact printing". Furthermore, the dividing walls 2 and the base-material 1 may be adhered by providing an adhesive layer between them.

Figure 2A:
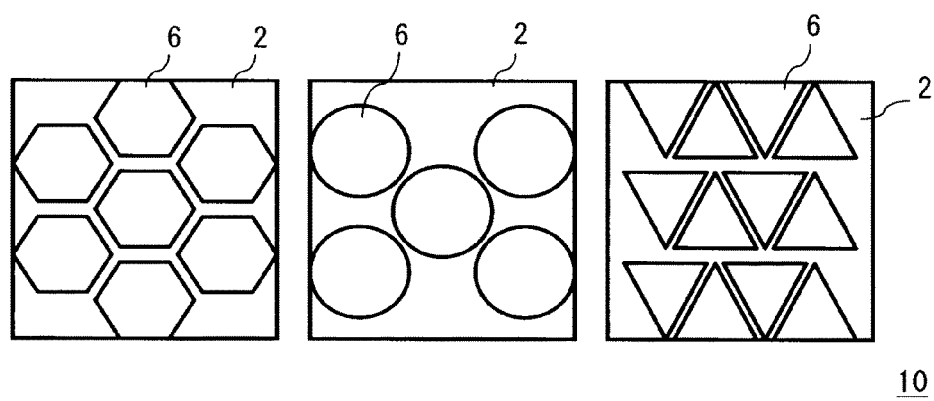
FIG. 2A is schematic views showing structures of a first substrate in accordance with an exemplary embodiment.
Figure 2B:
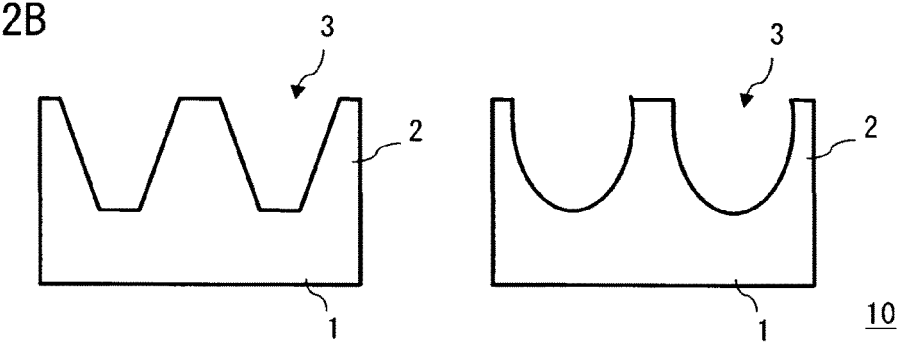
FIG. 2B is schematic views showing structures of a first substrate in accordance with an exemplary embodiment.

Although the concave portion 3 has a rectangular shape with one open side in cross-section and has a rectangular shape in top view in FIGS. 1A and 1B, its shape is not limited to this example. FIGS. 2A and 2B show other structures of a first substrate 10. FIG. 2A is schematic top views showing other structures of a first substrate 10, and FIG. 2B is schematic cross-sections showing other structures of a first substrate 10.

As shown in FIG. 2A, examples of the shape in top view of the base-material top area 6 surrounded by dividing walls 2, i.e., the shape in top view of the concave portion 3 include polygons such as a triangle, a quadrangle and a hexagon, and curved-line shapes such as a circle and an ellipse. On the first substrate 10, a first color-development layer (which is described later) is formed in the base-material top area 6 within the concave portion 3, and functions as a color-development portion, i.e., a pixel of the EC display element. Therefore, considering a balance among the easiness in manufacturing, the image viewability, and the like as an EC display element, the size of each of the base-material top area 6 is preferably $10^2$ to $5 \times 10^5$ μm$^2$, and the distance of the base-material top area 6 when measured from edge to edge for each of the base-material top areas 6 is preferably 15 to 450 μm. Further, the ratio of the base-material top area 6 to the dividing wall 2 is preferably 0.05 to 100.

As shown in FIG. 2B, examples of the shape in cross-section of the concave portion 3 formed by dividing walls 2 include shapes such as a rectangle or a trapezoid with one open side, a semicircle and a semi-ellipse. The space formed by these dividing walls 2, i.e., space within the concave portion 3 is filled with a substance including a π-electron based conjugated monomer and an electrolyte (which is described later). Therefore, considering a balance among the liquid filling property, and the thin-film property, the strength and the like as an overall EC display element, the height of the dividing wall 2 is preferably 3 to 100 μm.

The constituent material of the base-material 1 of the first substrate 10 may be glass, quartz, or the like, or may be preferably a transparent resin having flexibility such as polyacrylate such as polystyrene (PS) and polymethyl methacrylate (PMMA), a styrene-acrylate copolymer such as a styrene-methyl methacrylate copolymer (MS), a cycloolefin polymer (COP) such as polycarbonate (PC), polynorbornene, a cycloolefin copolymer (COC), polylactic acid, polyethylene terephthalate (PET), and polyethylene naphthalate (PEN).

Further, in order to utilize incident light to the maximum extent as a reflection type display element, a layer of a structure for suppressing the reflection of light called "antireflection structure (moth-eye structure)" is preferably provided on the rear surface 7 of the first substrate. Examples of the shape of the antireflection structure include any publicly-known shapes with which an effect of reducing the reflectivity is expected, including cones and polygonal pyramids though it is not limited to those shapes.

The maximum distance from edge to edge on the bottom surface of these cones, polygonal pyramids, and likes is preferably 100 to 300 nm, and their height is preferably 0.5 to 7 times that distance. Note that the structure of the antireflection structure and the first substrate 10 may be integrally formed. That is, the structure of the antireflection structure and the first substrate 10 may be formed from the same material and as an integral component having no joint portion. Needless to say, the antireflection structure may be prepared on a different substrate in advance, and then bonded to the rear surface of the first substrate 10 by an adhesive or the like. Publicly-known techniques can be applied as a method of integrally manufacturing the structure of the antireflection structure and the first substrate 10, though it is not limited to those techniques. Examples of them include a technique such as hot embossing using a thermoplastic resin, extrusion molding, injection molding, or glass molding. Publicly-known techniques can be applied as a method of manufacturing an antireflection structure on a different substrate in advance, though it is not limited to those techniques. For example, examples of them include photolithography, heat hardening, or photo nano imprinting, and a technique called "micro contact printing" by using a photo-curable resin or a thermosetting resin on a glass or resin substrate. Then, the manufactured antireflection structure is bonded to the rear surface of the first substrate 10 by an adhesive or the like. Note that in the above-mentioned techniques, the refractive indexes of the constituent material of the first substrate 10, of the different substrate on which an antireflection structure is formed, of the constituent material of the antireflection structure, and of the adhesive layer are preferably as close to each other as possible in order to reduce the reflectivity. Preferably, the difference in refractive index among these four materials falls within the range of about 0.01 to 0.3.

Figure 3A:
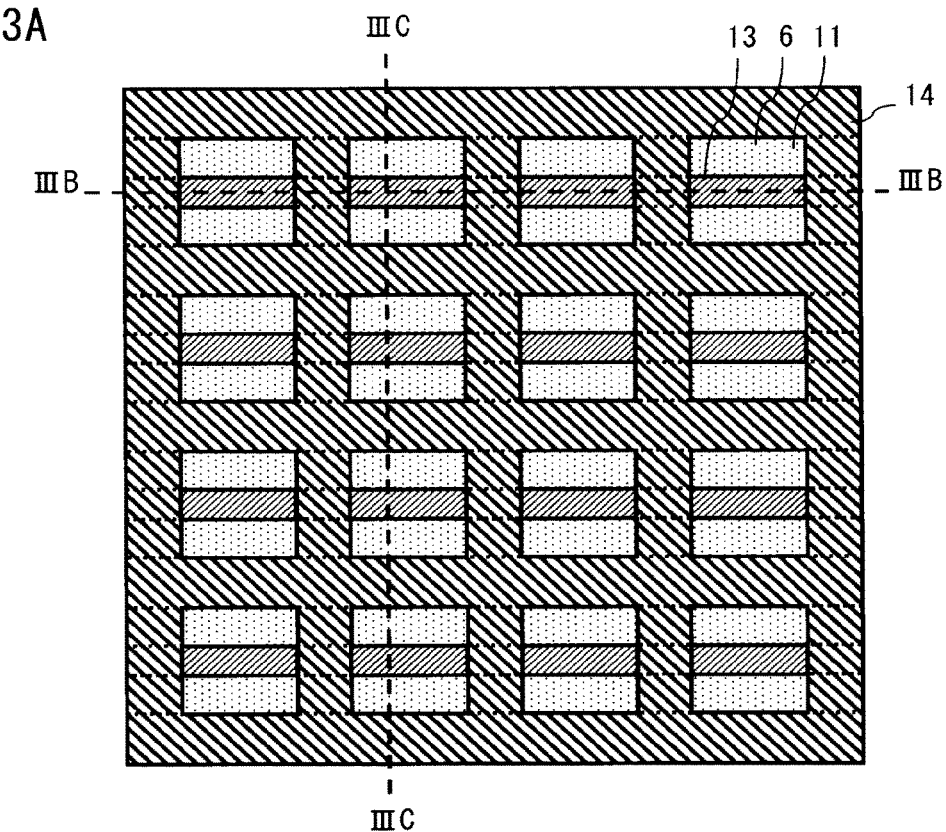
FIG. 3A is a schematic view showing a structure of a first substrate on which display electrodes are formed in accordance with an exemplary embodiment.
Figure 3B:
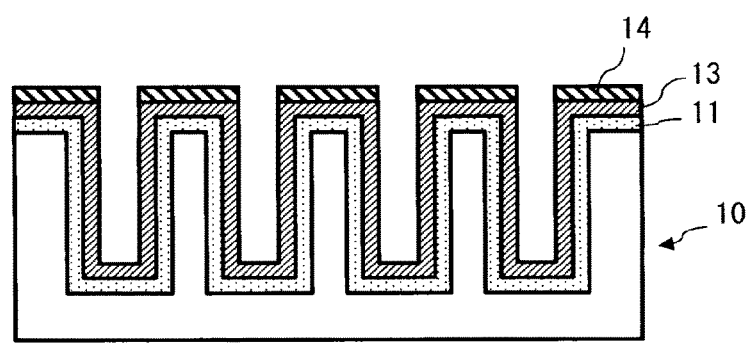
FIG. 3B is a schematic view showing a structure of a first substrate on which display electrodes are formed in accordance with an exemplary embodiment.
Figure 3C:
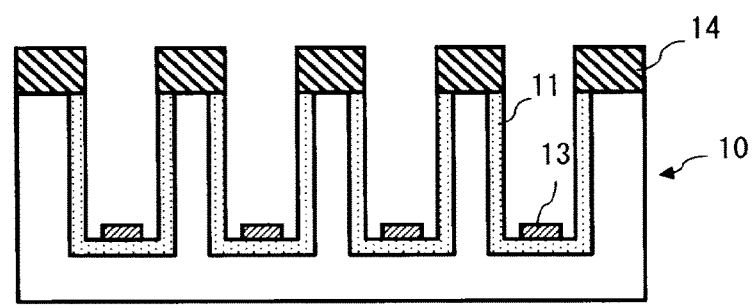
FIG. 3C is a schematic view showing a structure of a first substrate on which display electrodes are formed in accordance with an exemplary embodiment.
Figure 3D:
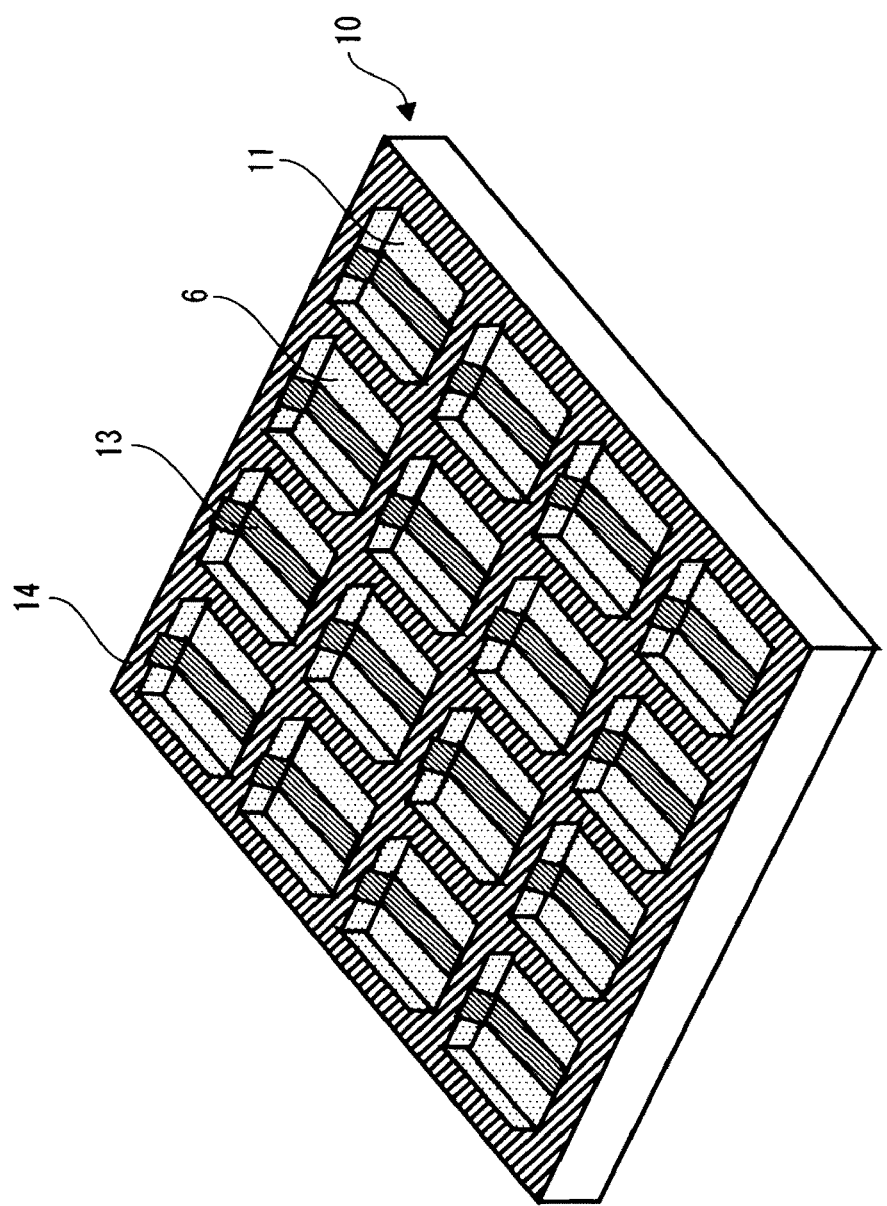
FIG. 3D is a schematic view showing a structure of a first substrate on which display electrodes are formed in accordance with an exemplary embodiment.

Display electrodes are formed on the above-described first substrate 10. Next, a structure of the display electrode is explained with reference to FIGS. 3A to 3D. FIG. 3A is a schematic top view showing a structure of a first substrate 10 on which display electrodes are formed. FIG. 3B is a schematic crosswise cross-section taken along the line IIIB-IIIB of FIG. 3A. FIG. 3C is a schematic lengthwise cross-section taken along the line IIIC-IIIC of FIG. 3A. FIG. 3D is a schematic perspective view showing a structure of a first substrate 10 on which display electrodes are formed. Note that a structure of an EC display element in accordance with the present invention is explained hereinafter and shown in the drawings with an assumption that it is applied to an EC display element of passive type driving (passive matrix), though it can be also applied to an EC display element of active type driving (active matrix).

A first conductive layer 11 is formed on a first substrate 10. Further, since the first conductive layer 11 functions as a display electrode, it is formed so as to cover at least a base-material top area 6. Further, in this example, it is formed so as to cover not only the base-material top area 6 but the whole concave portion 3 so that the dividing wall side area 5 is also covered. Further, as shown in FIG. 3A, a plurality of line-shaped first conductive layers 11 are formed over a plurality of base-material top areas 6. Furthermore, the plurality of first conductive layers 11 are formed so as to be parallel to each other. In this manner, the first conductive layers 11 are formed such that each of them connects a concave portion 3 in which a display electrode is formed to no more than two concave portions 3 among the concave portions 3 adjoining to that particular concave portion 3.

In other words, when attention is focused on a given concave portion 3, a first conductive layer 11 is formed so as to connect no more than two concave portions 3 among the concave portions 3 adjoining that given concave portion 3. As shown in FIG. 3B, for example, when attention is focused on the second concave portion 3 from the left, a first conductive layer 11 is formed so as to connect two concave portions 3 adjacent in the left-and-right direction. That is, in the crosswise cross-section, the first conductive layer 11 is formed so as to cover the first substrate 10, i.e., over the dividing wall top area 4, the dividing wall side area 5, and the base-material top area 6. Meanwhile, as shown in FIG. 3C, two concave portions 3 adjacent in the up-and-down direction are not connected by the first conductive layer 11. Specifically, in the lengthwise cross-section, the first conductive layer 11 is not formed over the dividing wall top area 4, and formed as separated pieces. In this manner, the first conductive layer 11 is formed so as to connect no more than two adjacent base-material top areas 6. Further, since the first conductive layer 11 serves as a portion through which incident light passes in the reflective type display element, it preferably has total light transmittance of 70% or higher.

Further, similarly to the first conductive layer 11, a plurality of line-shaped second conductive layers 13 are formed over the conductive layer 11. That is, similarly to the first conductive layer 11, the second conductive layer 13 is formed so as to connect no more than two adjacent base-material top areas 6. Further, the second conductive layer 13 is formed with a width narrower than that of the first conductive layer 11. That is, in contrast to the first conductive layer 11, the second conductive layer 13 is formed on part of the base-material top area 6. The second conductive layer 13 does not function as a display electrode, but as an electrical line for supplying, for example, a scan voltage. Therefore, the only requirement is that the second conductive layer 13 should be formed to connect the base-material top areas 6 on which display electrodes are formed. That is, the second conductive layer 13 is formed on the dividing walls 2 in order to electrically connect display electrodes on adjacent base-material top areas 6 to each other in a predetermined direction. Note that the "predetermined direction" can be various directions such as in the form of a straight line, a curved line, and a zigzag. Preferably, as shown in FIG. 3A, display electrodes may be connected in a direction in the form of a straight line. With the above-described structure, a scan voltage supplied to the second conductive layer 13 is supplied to display electrodes (first conductive layer 11). Further, by driving the EC display element in a passive manner, each pixel (which is described later) can be independently operated.

In this manner, the second conductive layer 13, which serves as an electrical line, contacts the first conductive layer 11, which serves as a display electrode. Therefore, material whose conductivity is not very high can be used for the first conductive layer 11. That is, conductive material that is chosen with emphasis on the light-transmissivity can be used. Meanwhile, unlike the first conductive layer 11, the only requirement for the second conductive layer 13 is to be formed so as to connect the base-material top areas 6. Therefore, material whose light-transmissivity is not very high can be used for the second conductive layer 13. That is, conductive material that is chosen with emphasis on the conductivity can be used. In this manner, by forming the display electrodes and the electrical lines separately, even the material that does not satisfy high light-transmissivity and high conductivity simultaneously can be used.

Further, in the dividing wall top area 4, an insulating layer 14 is formed on the second conductive layer 13 or on the dividing wall 2. This is formed in order to prevent the second conductive layer 13 on the first substrate 10 from contacting conductive material on the second substrate, in particular a third conductive layer and a white-color layer (which are described later). That is, it is provided for the purpose of preventing electrodes from contacting to each other in the EC element circuit and thus from being short-circuited. The display electrodes, electrical lines, and the likes are constructed in the manner described above.

Figure 4A:
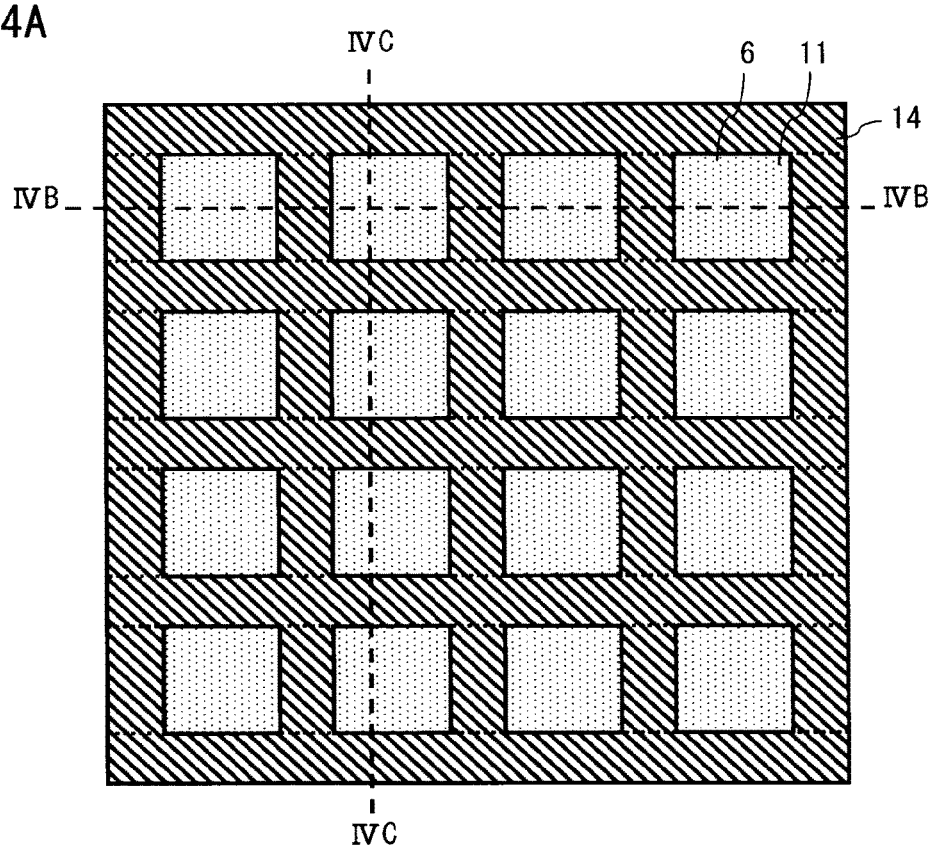
FIG. 4A is a schematic view showing a structure of a first substrate on which display electrodes are formed in accordance with an exemplary embodiment.
Figure 4B:
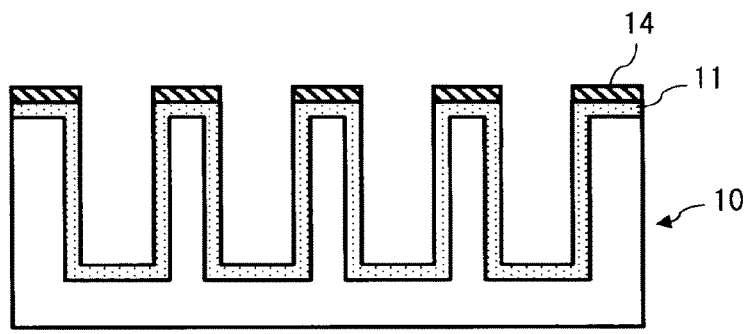
FIG. 4B is a schematic view showing a structure of a first substrate on which display electrodes are formed in accordance with an exemplary embodiment.
Figure 4C:
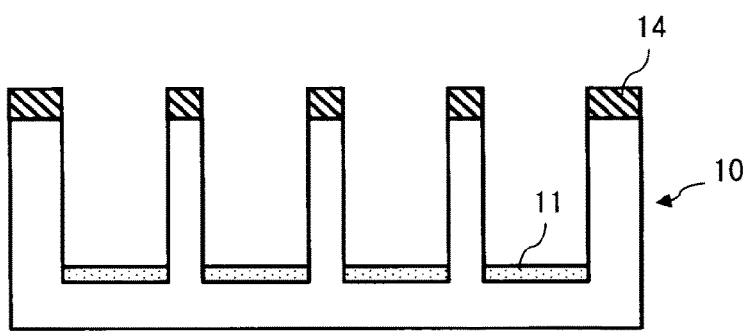
FIG. 4C is a schematic view showing a structure of a first substrate on which display electrodes are formed in accordance with an exemplary embodiment.
Figure 4D:
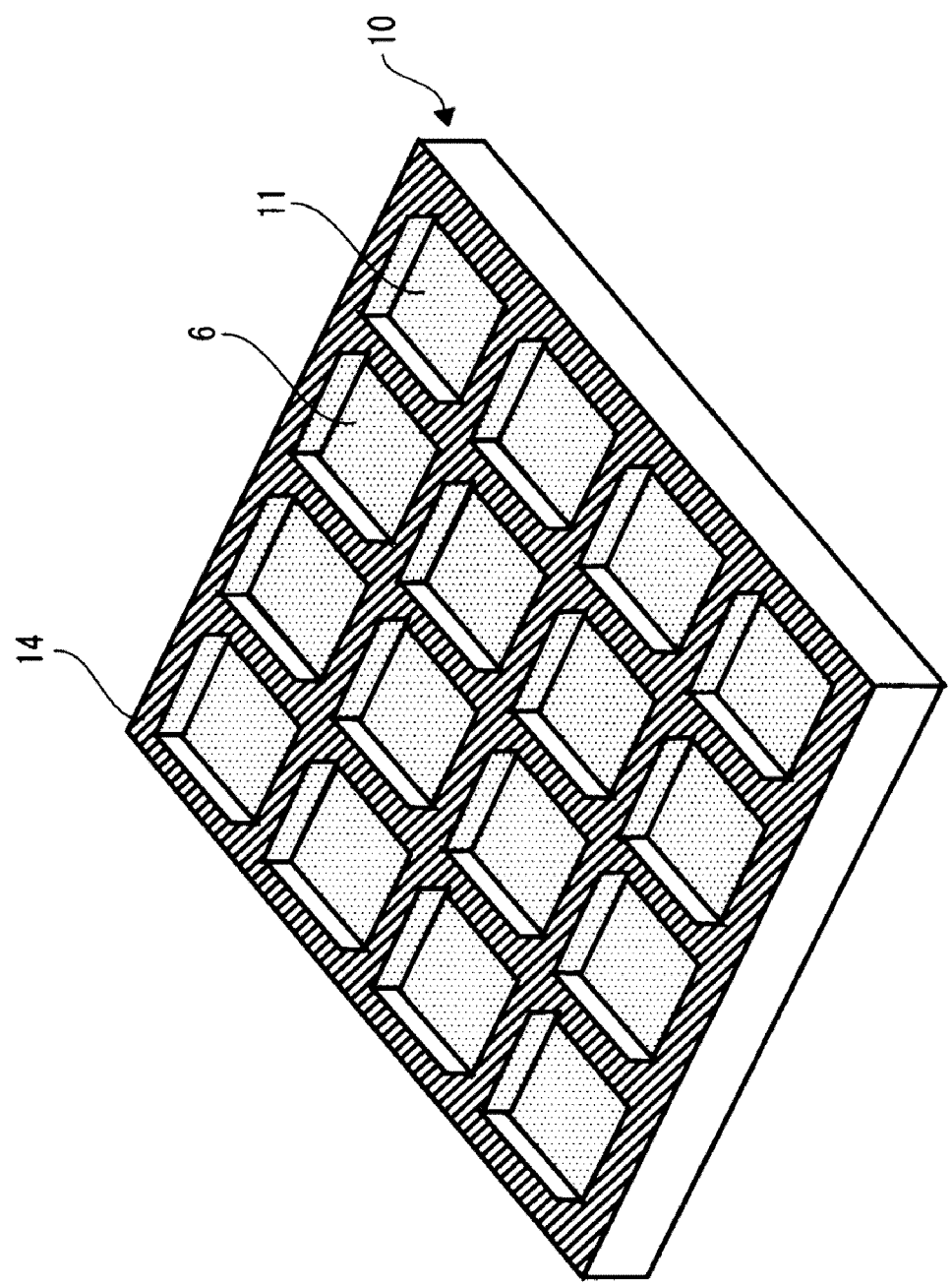
FIG. 4D is a schematic view showing a structure of a first substrate on which display electrodes are formed in accordance with an exemplary embodiment.

However, the structure of the display electrode is not limited to the above-described structure. Another structure of a display electrode is explained hereinafter with reference to FIGS. 4A to 4D. FIG. 4A is a schematic top view showing another structure of a first substrate 10 on which display electrodes are formed. FIG. 4B is a schematic crosswise cross-section taken along the line IVB-IVB of FIG. 4A. FIG. 4C is a schematic lengthwise cross-section taken along the line IVC-IVC of FIG. 4A. FIG. 4D is a schematic perspective view showing another structure of a first substrate 10 on which display electrodes are formed.

As shown in FIGS. 4B and 4C, it has such a structure that the second conductive layer 13 is not formed on the first substrate 10, but only the first conductive layer 11 and the insulating layer 14 are formed. That is, similarly to the example shown in FIGS. 3A to 3D, a first conductive layer 11 is formed on the first substrate 10. Note that in this example, among the four dividing wall side areas 5 in each concave portion 3, the first conductive layer 11 is not formed in two opposing dividing wall side areas 5. In FIGS. 4A to 4D, the first conductive layer functions as a display electrode and an electrical line. That is, the display electrode and the electrical line are integrally formed. Further, in the dividing wall top area 4, an insulating layer 14 is formed on the first conductive layer 11 or on the dividing wall 2. It is provided for the purpose of preventing electrodes from contacting to each other in the EC element circuit and thus from being short-circuited as in the case of the above-described example. In this manner, any structure can be adopted, provided that display electrodes and electrical lines are formed on the first substrate 10 having the dividing walls 2 so that the structure functions as an EC display element.

The viewability as a display element does not deteriorate unless the total light transmittance is lowered to or below 70%. Therefore, examples of material constituting the first conductive layer 11 include metal, metal oxide, conductive carbide, conductive macromolecule (conductive polymer), and material including their combination, their alloy, and the like, though it is not limited to those materials. For example, examples of the metal and metal oxide include lithium, beryllium, magnesium, calcium, strontium, barium, boron, aluminum, gallium, indium, silver, gold, copper, nickel, palladium, platinum, chromium, molybdenum, tungsten, manganese, cobalt, and their oxide, and their combination or their alloy. More preferable examples include indium-tin oxide (ITO), antimony-doped tin oxide (ATO), antimony-doped zinc oxide (AZO), zinc oxide (ZnO), and silver. Further, similar materials to those for the first conductive layer 11 can be also used as material constituting the second conductive layer 13.

For example, examples of the conducive carbide include a single wall carbon nano-tube (SWCNT), a double wall carbon nano-tube (DWCNT) or a multi wall carbon nano-tube (MWCNT), a carbon nano-sheet (graphene sheet).

For example, examples of the conductive polymer include poly(ethylene-3,4-dioxy thiophene) (PEDOT), a polyaniline derivative, a polypyrrole derivative.

Material constituting the insulating layer 14 may be any proper material that can function as barrier between electrodes. The insulating layer 14 provides an electrical barrier, and can prevent the above-described conductive layers from being electrically short-circuited. Therefore, the insulating layer 14 includes substantially no pin-hole, and is preferably manufactured from high-resistivity material having a electrical resistance of about $10^8$ Ωcm or higher, and more preferably about $10^{12}$ Ωcm or higher. The proper high-resistivity material includes silicon nitride, boron nitride, aluminum nitride, silicon oxide, aluminum oxide, polyimide, polyvinylidene fluoride, and parylene (parylen), though it is not limited to those materials.

Note that the insulating layer 14 is preferably black. In this way, it can be used as the concave portions 3 arranged in a matrix pattern, i.e., a film for shielding light in portions other than pixels (black matrix). Further, it can improve the contrast. To make it black, a photosensitive resin called "color resist" may be used. Alternatively, carbide such as a carbon black may be mixed into a photo-curable resin, a thermosetting resin, a thermoplastic elastomer, or the like within the level where it does not become conductive.

A second substrate 20 on which opposed electrodes are formed is disposed opposite to the above-described first substrate 10. A second substrate 20 on which opposed electrodes are formed is explained hereinafter with reference to FIGS. 5A to 5F. FIGS. 5A to 5F are schematic cross-sections showing structures of a second substrate 20 on which opposed electrodes are formed.

Figure 5A:
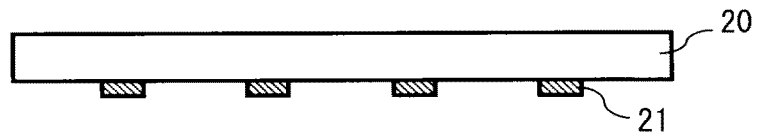
FIG. 5A is a schematic view showing a structure of a second substrate on which opposed electrodes are formed in accordance with an exemplary embodiment.

As shown in FIG. 5A, a plurality of separated third conductive layers 21 are formed on a second substrate 20. Similar materials to those for the first substrate 10 can be also used for the second substrate 20. The plurality of third conductive layers 21 are formed so as to be parallel to each other. These third conductive layers 21 function as opposed electrodes. Further, the third conductive layer 21 is formed in such a manner that when the first substrate 10 and the second substrate 20, on both of which electrodes are formed, are disposed opposite to each other, it crosses the first conductive layer 11 and the second conductive layer 13 formed on the first substrate 10. Further, since pixels are disposed in the concave portions 3, it is configured such that they cross each other at the concave portions 3 of the first substrate 10. That is, a display electrode and an opposed electrode are disposed opposite to each other in a concave portion 3. This exemplary embodiment is formed such that the third conductive layer 21 and the first conductive layer 11 are perpendicular to each other and the third conductive layer 21 and the second conductive layer 13 are perpendicular to each other. Further, by supplying a display voltage to the third conductive layer 21, the EC display element can be driven in a passive manner.

Figure 5B:
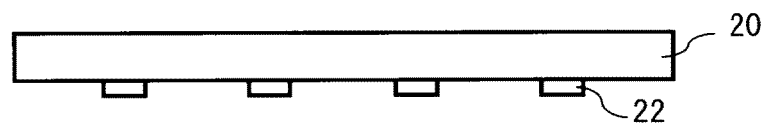
FIG. 5B is a schematic view showing a structure of a second substrate on which opposed electrodes are formed in accordance with an exemplary embodiment.
Figure 5C:
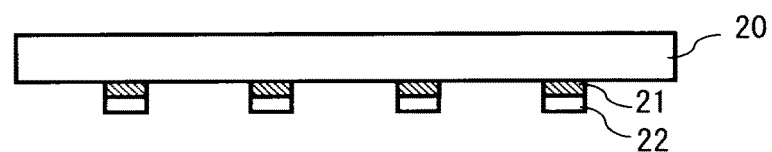
FIG. 5C is a schematic view showing a structure of a second substrate on which opposed electrodes are formed in accordance with an exemplary embodiment.
Figure 5D:
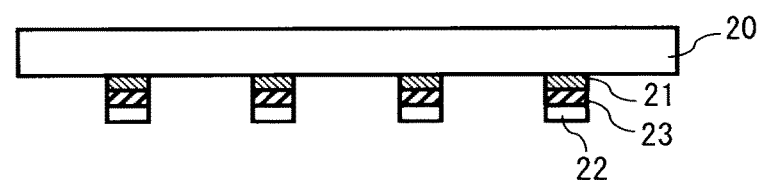
FIG. 5D is a schematic view showing a structure of a second substrate on which opposed electrodes are formed in accordance with an exemplary embodiment.
Figure 5E:
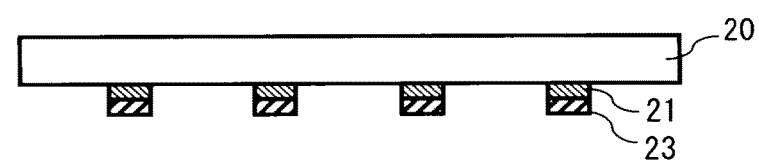
FIG. 5E is a schematic view showing a structure of a second substrate on which opposed electrodes are formed in accordance with an exemplary embodiment.
Figure 5F:
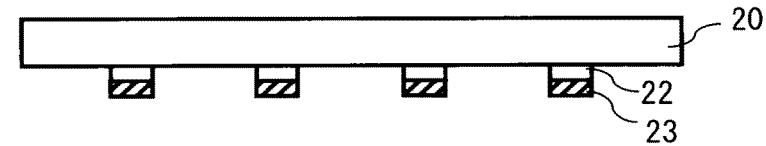
FIG. 5F is a schematic view showing a structure of a second substrate on which opposed electrodes are formed in accordance with an exemplary embodiment.

Further, as shown in FIGS. 5A to 5F, various structures can be adopted as a structure of the second substrate 20 side, provided that at least conductive material that functions as an opposed electrode is formed in the manner described above. In FIG. 5B, a white-color layer 22 having conductivity is formed in place of the third conductive layer 21. In FIG. 5C, a stacked structure in which a third conductive layer 21 and a white-color layer 22 are successively formed from the second substrate 20 side is adopted. In FIG. 5D, a stacked structure in which a third conductive layer 21, a second color-development layer 23, and a white-color layer 22 are successively formed from the second substrate 20 side is adopted. In FIG. 5E, a stacked structure in which a third conductive layer 21 and a second color-development layer 23 are successively formed from the second substrate 20 side is adopted. In FIG. 5F, a stacked structure in which a white-color layer 22 and a second color-development layer 23 are successively formed from the second substrate 20 side is adopted. In this manner, for example, six possible ways, i.e., second substrate 20—third conductive layer 21, second substrate 20—third conductive layer 21—white-color layer 22, second substrate 20—third conductive layer 21—second color-development layer 23, second substrate 20—third conductive layer 21—second color-development layer 23—white-color layer 22, second substrate 20—white-color layer 22, and second substrate 20—white-color layer 22—second color-development layer 23 can be adopted. Further, in the above combinations, the conductive material formed on the second substrate 20, in particular, the third conductive layer 21 or the white-color layer 22 functions as the opposed electrode.

Note that in the case of second substrate 20—third conductive layer 21, second substrate 20—third conductive layer 21—second color-development layer 23, or the like, the white-color layer 22 may be provided on the rear surface of the second substrate 20. By providing a white-color layer 22 like this, light that passed through the first color-development layer on the first substrate 10 (which is described layer) is reflected by the white-color layer 22 on the second substrate 20 or on the rear surface, and thereby passes through the first color-development layer again and is visually recognized by an observer. In this way, the display characteristics of the EC display element are improved.

In the case where the second color-development layer 23 is provided, a structure in which the first color-development layer and the second color-development layer 23 are disposed opposite to each other through an electrolyte layer (which is described later) between the display electrodes and the opposed electrodes is adopted. In this way, for example, when an oxidation reaction occurs in the first color-development layer, a reduction reaction, which is an inverse reaction to the oxidation reaction, occurs in the second color-development layer 23. That is, since the give-and-receive of electrons is satisfied as a whole in the EC display element, the life span, the response speed, and the like of the EC display element can be improved. Further, the second color-development layer 23 itself produces a color change by the electrochromic. Therefore, it requires some caution because if light that passed through the first color-development layer passes through or is reflected on the second color-development layer 23, the color tone could be further changed. To prevent this, a white-color layer 22 may be stacked above the second color-development layer 23, so that the color change of the second color-development layer 23 can be concealed.

Examples of material constituting the third conductive layer 21 include metal, metal oxide, conductive carbide, conductive macromolecule (conductive polymer), and material including their combination, their alloy, and the like, though it is not limited to those materials. For example, examples of the metal and metal oxide include lithium, beryllium, magnesium, calcium, strontium, barium, boron, aluminum, gallium, indium, silver, gold, copper, nickel, palladium, platinum, chromium, molybdenum, tungsten, manganese, cobalt, and their oxide, and their combination or their alloy. More preferable examples include indium-tin oxide (ITO), antimony-doped tin oxide (ATO), antimony-doped zinc oxide (AZO), zinc oxide (ZnO), and silver.

For example, examples of the conducive carbide include a single wall carbon nano-tube (SWCNT), a double wall carbon nano-tube (DWCNT) or a multi wall carbon nano-tube (MWCNT), a carbon nano-sheet (graphene sheet).

For example, examples of the conductive polymer include poly(ethylene-3,4-dioxy thiophene) (PEDOT), a polyaniline derivative, a polypyrrole derivative.

Any material including inorganic materials, organic materials, and organic-inorganic composite materials that exhibit electrochromic causing a color change by oxidation or reduction can be used as material constituting the second color-development layer 23. Examples of the inorganic materials include $IrO_x$, $NiO_x$, $WO_3$, $MoO_3$, $TiO_2$, $RuO_x$, Ag, AgCl, $ZrO_x$ and $CeO_x$.

Further, examples of the organic material include an electron based conjugated polymer including at least one compound selected from a group consisting of a low-molecular organic compound such as a viologen derivative and a terephthalic acid derivative; aniline; a π-electron based conjugated monomer having a structure capable of introducing boron in a principal chain; a π-electron based conjugated monomer in which part of carbon of an aromatic ring is replaced by oxygen and which is typified by pyran; a benzene derivative such as 2,3-dialkyl phenyl, 2,5-dialkyl phenyl, 2,3,5,6-tetraalkyl phenyl, 2,3-alkoxy phenyl, 2,5-alkoxy phenyl, 2,3,5,6-tetraalkoxy phenyl, 2-(N,N-dialkyl amino)phenyl, 2,5-di(N,N-dialkyl amino)phenyl, 2,3-di(N,N-dialkyl amino)phenyl, p-phenylene oxide, p-phenylene sulfide, p-phenylene amino, p-phenylene vinylene, and fluorene; an acene derivative such as naphthalene, anthracene, tetracene, pentacene, hexacene, heptacene, naphthylene vinylene, peri-naphthalene, amino pyrene, and phenanthrene; a carbazole derivative such as N-alkyl carbazole; a pyridine derivative such as pyrimidine, pyridazine, triazine, pyrazine, chinoline, and purine; a furan derivative such as 3-alkyl furan; a pyrrole derivative such as N-alkyl pyrrole, ethylene-3,4-dioxy pyrrole, and propylene-3,4-dioxy pyrrole; a thiophene derivative such as thiophene vinylene, alkyl thiophene, ethylene-3,4-dioxy thiophene, propylene-3,4-dioxy thiophene, thienothiophene, thienofuran, thienopyrazine, and isothianaphthene; and a π-electron based conjugated compound such as acetylene, oxadiazole, thiazyl, selenophene, tellurophene, imidazole, oxazole, thiazole, pyrazole, isoxazole, isothiazole, benzotriazole, pyran, benzothiadiazole, and benzooxadiazole.

Examples of the organic-inorganic composite materials include composite material having a ligand containing metal such as aluminum, titanium, indium, cadmium, manganese, iron, copper, silver, tin, antimony, lead, sodium, ruthenium, calcium and nickel, and an organic compound having part that bonds to the ligand by a bond such as a hydrogen bond, an ionic bond, a static attractive force, and an atomic force. More specific examples of the organic-inorganic composite materials include a prussian-blue derivative and a ferrocene derivative.

Publicly-known material can be used as material constituting the white-color layer 22, though it is not limited to those materials Examples include titanium oxide, calcium carbonate, silver, foam resin, a prussian-blue derivative, ITO, ATO, AZO, ZnO, insulative carbide, and a multi-laminated body of resins having different refractive indexes. The white-color layer 22 may be composed of a conductive substance, or composed of an ionic conductive substance. Further, the white-color layer 22 may be formed from insulating material.

Figure 6:
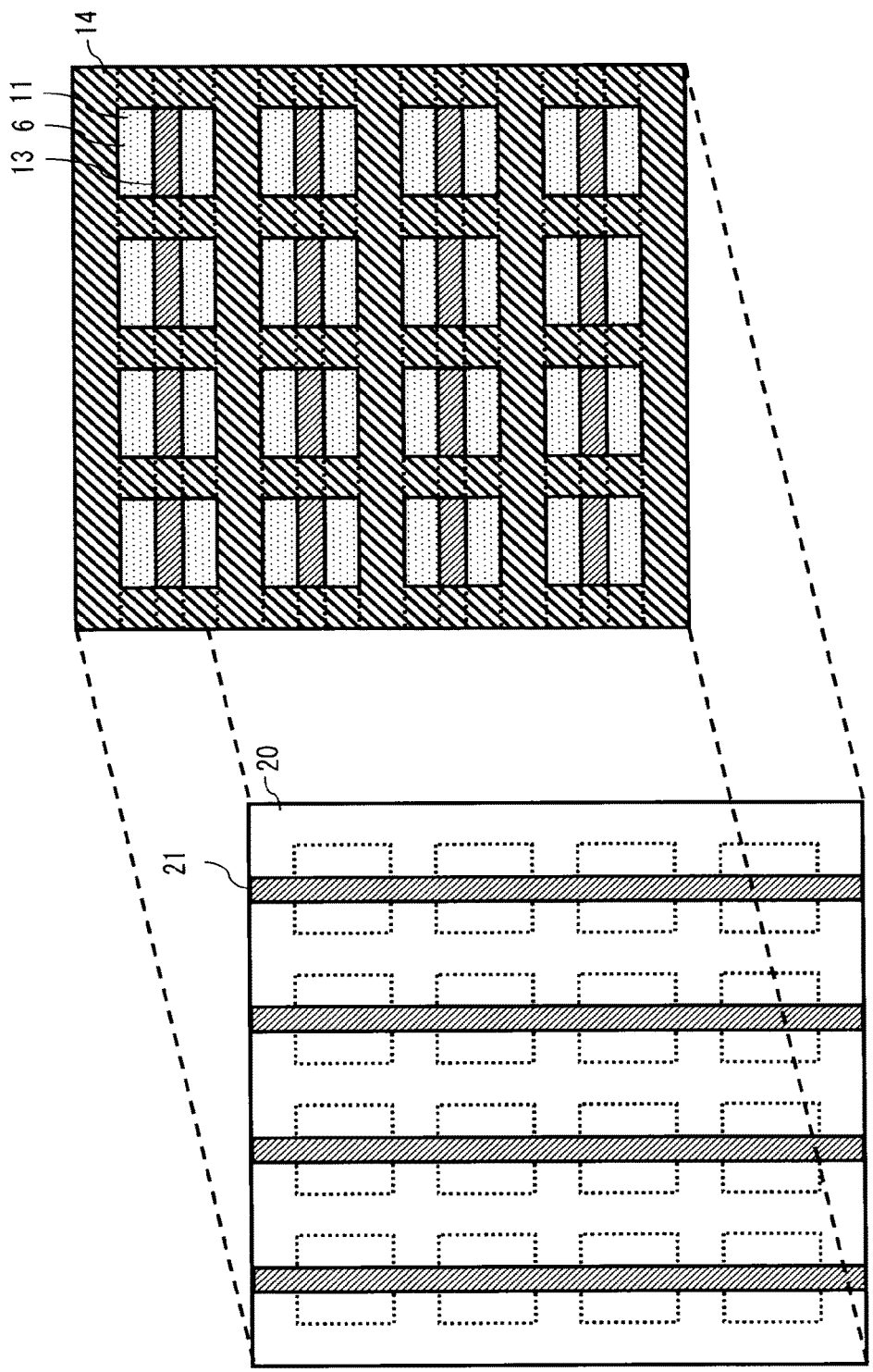
FIG. 6 is a top view showing a state in which first and second substrates in accordance with an exemplary embodiment are disposed opposite to each other.
Figure 7:
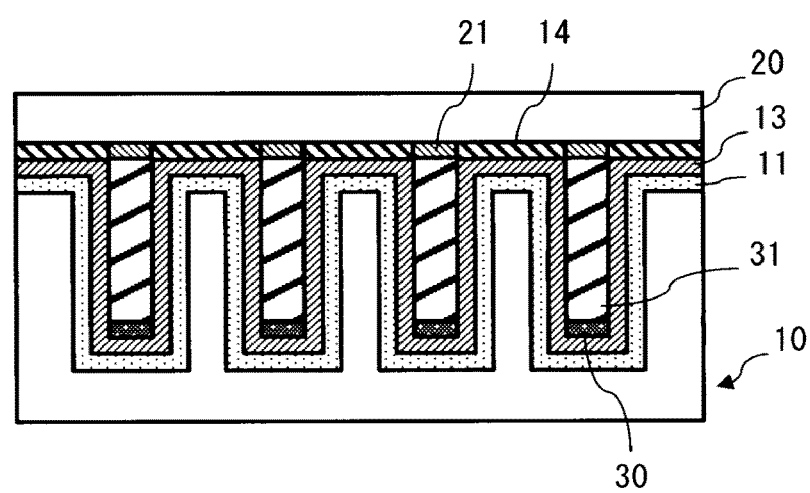
FIG. 7 is a schematic crosswise cross-section showing a structure of an EC display element in accordance with an exemplary embodiment.

Then, an EC display element is formed by disposing the above-described first substrate 10 and the second substrate 20 opposite to each other such that their electrodes are placed inside the substrates. Next, an overall structure of an EC display element is explained hereinafter with reference to FIGS. 6 and 7. FIG. 6 is a schematic top view showing a state in which first and second substrates 10 and 20 are disposed opposite to each other. FIG. 7 is a schematic crosswise cross-section showing a structure of an EC display element. In this example, the first substrate 10 shown in FIGS. 3A to 3D and the second substrate 20 shown in FIG. 5A are used. Needless to say, embodiments are not limited to this example, and first and second substrates 10 and 20 having various configurations like the ones described above may be combined.

As shown in FIG. 6, the first and second substrates 10 and 20 are disposed opposite to each other such that portions at which the first conductive layer 11 and the second conductive layer 13 cross the third conductive layer 21 become pixels. In this example, the first conductive layer 11 and the second conductive layer 13 cross the third conductive layer 21 at right angles. That is, the third conductive layer 21 of the second substrate 20 is disposed above the base-material top areas 6 of the first substrate 10. In this way, passive type driving becomes possible. Further, as shown in FIG. 7, the insulating layer 14 formed on the first substrate 10 is in contact with the second substrate 20 on which the opposed electrodes and the likes are formed. Further, in the base-material top areas 6 of the first substrate 10, a first color-development layer 30 and an electrolyte layer 31 are formed between the display electrode and the opposed electrode. Specifically, in the base-material top areas 6, a first color-development layer 30 is formed on the first conductive layer 11 and the second conductive layer 13 so as to contact them. That is, a first color-development layer 30 is formed for each pixel. Note that a different one of pigments capable of developing colors including cyan (C), magenta (M), and yellow (Y), which are used in subtractive color mixture, for example, is applied for each pixel in the first color-development layer 30 so that each pixel is painted with a different color. By doing so, displaying in full color can be implemented by the juxtaposition mixture method.

The first color-development layer 30 is formed so as to contact the first conductive layer 11 and the second conductive layer 13. Further, when the first substrate 10 shown in FIGS. 4A to 4D is used, the first color-development layer 30 is formed so as to contact the first conductive layer 11. As described above, the first color-development layer 30 needs to be in contact with at least the first conductive layer 11 or the second conductive layer 13. The first color-development layer 30 is formed over roughly the entire surface of the base-material top area 6. In this example, the first color-development layer 30 includes a π-electron based conjugated polymer film derived from a π-electron based conjugated monomer. Further, the space between the first and second substrates 10 and 20 is filled with an electrolyte layer 31. That is, in the concave portion 3, the space between the first color-development layer 30 of the first substrate 10 and the third conductive layer 21 of the second substrate 20 is filled with an electrolyte layer 31. As described above, the electrolyte layer 31 needs to be in contact with at least the first color-development layer 30 and the third conductive layer 21. This holds true for the case where the second substrate 20 shown in FIGS. 5B to 5F is used. That is, the third conductive layer 21, the white-color layer 22, or the second color-development layer 23 formed on the second substrate 20 needs to be in contact with the electrolyte layer 31.

Figure 8:
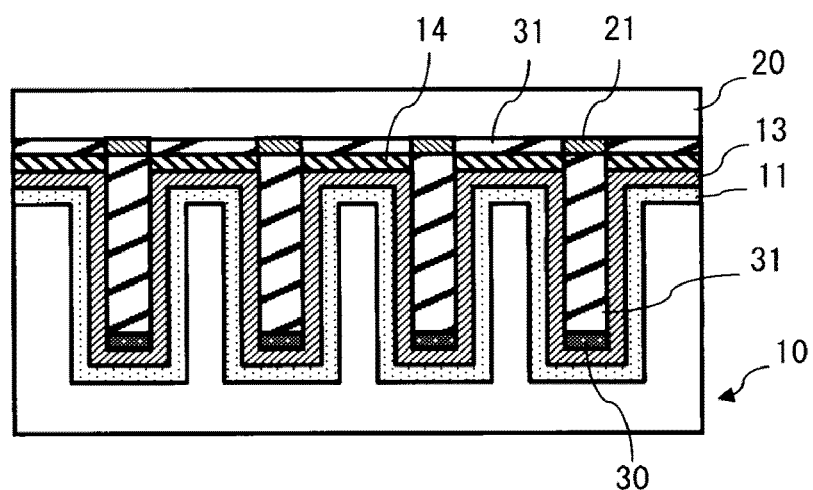
FIG. 8 is a schematic crosswise cross-section showing another structure of an EC display element in accordance with an exemplary embodiment.

Further, in addition to the above-described structures, other structures including the one shown in FIG. 8, for example, can be also adopted for the EC display element. FIG. 8 is a schematic crosswise cross-section showing another structure of an EC display element.

The electrochromic display device shown in FIG. 8 is different from the EC display element shown in FIG. 7 in that the second substrate 20 is not in contact with the insulating layer 14. Further, the space between the second substrate 20 and the insulating layer 14 is filled with an electrolyte layer 31. Other structures are similar to those of the EC display element shown in FIG. 7, and therefore their explanation is omitted. As described above, the second substrate 20 may be in contact with the insulating layer 14, or partially be in contact with the electrolyte layer 31.

Further, coating material may be inserted in at least one of the spaces between the first color-development layer 30 and the display electrodes and between the second color-development layer 23 and the opposed electrodes. That is, coating material may be inserted in at least one of the spaces between the first color-development layer 30 and the first conductive layer 11, between the second color-development layer 23 and the white-color layer 22, and between the second color-development layer 23 and the third conductive layer 21. Further, a semiconductor porous layer is preferably used for the coating material. This is because, by using a semiconductor layer as the coating material, the transfer of electrons is cut off between the conductive layer on the first substrate 10 and the conductive layer on the second substrate 20 when an open circuit is formed. In this way, the oxidation-reduction state of at least one of the first color-development layer 30 and the second color-development layer 23 can be maintained. Further, even in the case where the second color-development layer 23 is not provided, i.e., the case where the inverse reaction of the first color-development layer 30 does not occurs, the use of a porous layer makes the surface area larger, and thus enabling a larger capacitance. Further, an electric double layer can be formed, so that the oxidation/reduction state of the first color-development layer 30 can be maintained even in the open-circuit state.

The first color-development layer 30 includes a π-electron based conjugated polymer film derived from a π-electron based conjugated monomer. The π-electron based conjugated monomer can be any compound, provided that a film can be formed from the compound by electrochemically polymerization. However, preferable examples include material containing at least one compound selected from a group consisting of aniline; a π-electron based conjugated monomer having a structure capable of introducing boron in a principal chain; a π-electron based conjugated monomer in which part of carbon of an aromatic ring is replaced by oxygen and which is typified by pyran; a benzene derivative such as 2,3-dialkyl phenyl, 2,5-dialkyl phenyl, 2,3,5,6-tetraalkyl phenyl, 2,3-alkoxy phenyl, 2,5-alkoxy phenyl, 2,3,5,6-tetraalkoxy phenyl, 2-(N,N-dialkyl amino)phenyl, 2,5-di(N,N-dialkyl amino)phenyl, 2,3-di(N,N-dialkyl amino)phenyl, p-phenylene oxide, p-phenylene sulfide, p-phenylene amino, p-phenylene vinylene, and fluorene; an acene derivative such as naphthalene, anthracene, tetracene, pentacene, hexacene, heptacene, naphthylene vinylene, peri-naphthalene, amino pyrene, and phenanthrene; a carbazole derivative such as N-alkyl carbazole; a pyridine derivative such as pyrimidine, pyridazine, triazine, pyrazine, chinoline, and purine; a furan derivative such as 3-alkyl furan; a pyrrole derivative such as N-alkyl pyrrole, ethylene-3,4-dioxy pyrrole, and propylene-3,4-dioxy pyrrole; a thiophene derivative such as thiophene vinylene, alkyl thiophene, ethylene-3,4-dioxy thiophene, propylene-3,4-dioxy thiophene, thienothiophene, thienofuran, thienopyrazine, and isothianaphthene; and a π-electron based conjugated compound such as acetylene, oxadiazole, thiazyl, selenophene, tellurophene, imidazole, oxazole, thiazole, pyrazole, isoxazole, isothiazole, benzotriazole, pyran, benzothiadiazole, and benzooxadiazole. Further, in addition to the first color-development layer 30, the second color-development layer 23 can be also electrochemically polymerized by using the above-mentioned material. Furthermore, the first color-development layer 30 can be formed from material similar to that of the second color-development layer 23.

Further, the first color-development layer 30 and the electrolyte layer 31 are formed from a monomer-containing electrolyte layer that contains a π-electron based conjugated monomer and an electrolyte (which is described later). The concentration of the π-electron based conjugated monomer may be 0.001 to 1.0 [mol/l], and preferably 0.01 to 0.5 [mol/l] with respect to the monomer-containing electrolyte. When the concentration of the π-electron based conjugated monomer is less than or equal to 0.001 [mol/l], the film-thickness could be not sufficient for use as a color-development layer and the film-formation property could poor even if the film is formed by the electrochemically polymerization. On the other hand, when the concentration of the π-electron based conjugated monomer is larger than or equal to 1.0 [mol/l], the amount of unreacted monomer that was not formed into a film by the electrochemically polymerization becomes so large that a deactivation process by ultraviolet irradiation or heat treatment becomes indispensable. Further, it is also undesirable because if residual monomer remains even after the deactivation process, a film could be formed on the unintended substrate side whenever color development/disappearance is repeated by the application of a forward/reverse voltage after the deactivation process.

An electrolyte in any form can be used for the electrolyte layer 31. For example, if a solution type is used, it has large ionic conductance. Therefore, the response speed and the drive voltage/current can be reduced. Further, if a gel type or a solid type is used, a reliable element in which no leakage occurs can be obtained. In general, a substance obtained by dissolving lithium salt such as $LiClO_4$, $LiAsF_6$, $LiPF_6$ and $LiBF_4$; ammonium salt such as $(C_4H_9)_4N^+BF_4^-$, $(C_4H_9)_4N^+PF_6^-$, $NH_4BF_4^-$ and $NH_4PF_6^-$; or sulfonic acid salt such as p-toluene sulfonic acid sodium and dodecylbenzene sulfonic acid sodium as a supporting electrolyte in an organic solvent such as acetonitrile, butyrolactone, propylene carbonate, and tetrahydrofuran is used for the solution type electrolyte.

In the case where the electrolyte includes a supporting electrolyte, the concentration of the supporting electrolyte may be 0.1 to 5.0 [mol/l] with respect to the monomer-containing electrolyte, and preferably about 5 to 10 times the concentration of the π-electron based conjugated monomer. The supporting electrolyte concentration less than or equal to 0.1 [mol/l] makes the ionic conductivity insufficient, and thus making it impossible to implement the electrochemically polymerization of the π-electron based conjugated monomer. Further, it is also undesirable because when color development/disappearance is repeated by application of a forward/reverse voltage after that, there is a high possibility that problems such as a slow response speed and an occurrence of unevenness in color development could occur. On the other hand, the supporting electrolyte concentration larger than or equal to 5.0 [mol/l] is also undesirable because there is a high possibility that the supporting electrolyte could easily become a saturated state and be precipitated.

Further, ambient temperature molten salt (ionic liquid) may be used for the electrolyte layer for the purpose of improving the efficiency and the safety. Any combination of an anion and a cation mentioned below can be used for the ionic liquid. Examples of the anion include a compound having tetrafluoroborate, hexafluorophosphate, trifluoromethylsulfonylimido, pentafluoroethylsulfonylimido or the like. Examples of the cation include a compound having an imidazolium based cation such as ethylmethylimidazolium and methylbutylimidazolium, pyrrolidinium based cation such as butylmethylpyrrolidinium and butylpyridinium, and ammonium based cation such as butyltrimethylammonium and diethylmethoxyethylmethylammonium. By using anionic liquid, a high-speed response and an excellent memory property can be achieved.

Further, a solid electrolyte such as $Ta_2O_5$ and $MgF_2$ is used for the solid electrode. Further, with regard to the polymeric solid electrolyte, a polymeric solid electrolyte in which a substituent that takes on the ionic conductivity such as polystyrene sulfonate and Nafion (registered trademark) may be used. Alternatively, a substance obtained by dispersing a supporting electrolyte in matrix (base material) polymeric material may be also used. Examples of the matrix polymer include polyethyleneoxide, polyethyleneimine, and polyethylenesulfide whose skeletal units are expressed as —(C—C—O)$_n$—, —(C—C—N)$_n$—, and —(C—C—S)$_n$— respectively. These materials may be used as the principal chain structure, and may include branching. Further, polymethyl methacrylate, polyvinylidene fluoride chloride, polycarbonate, and the like are also preferable. When a solid electrolyte is to be formed, a necessary plasticizer(s) may be added to the matrix polymer. If the matrix polymer is hydrophilic, the plasticizer is preferably water, ethyl alcohol, isopropyl alcohol, or a mixture of them or the like. Further, if the matrix polymer is hydrophobic, the plasticizer is preferably propylene carbonate, dimethyl carbonate, ethylene carbonate, γ-butyrolactone, acetonitrile, sulfolane, dimethoxy ethane, ethyl alcohol, isopropyl alcohol, dimethyl formaldehyde, dimethyl sulfoxide, dimethyl acetamide, n-methylpyrolidone, or a mixture of them or the like. Further, examples of the supporting electrolyte dispersed in the matrix polymer include lithium salt such as LiCl, LiBr, LiI, $LiBF_4$, $LiClO_4$, $LiPP_6$ and $LiCF_3SO_3$, potassium salt such as KCl, KI and KBr, sodium salt such as NaCl, NaI and NaBr, or tetraalkylammonium salt such as tetraethyl ammonium fluoroborate, perchloric acid tetraethyl ammonium, tetrabutyl ammonium fluoroborate, perchloric acid tetrabutyl ammonium, and tetrabutyl ammonium halide. Alkyl chain lengths of the above-mentioned fourth-grade ammonium salt (tetra ammonium salt) can be irregular.

Next, a passive driving method of the above-described EC display element is explained hereinafter. The following explanation is made by taking an EC display element shown in FIG. 7 as an example. Firstly, the first conductive layer 11 and the third conductive layer 21 are successively selected in a time series manner, and a scan voltage and a display voltage are applied to the first conductive layer 11 and the third conductive layer 21 respectively. As a result, a forward/reverse voltage is applied to the pixel at which the selected first conductive layer 11 and the third conductive layer 21 cross each other. Then, ions are doped into/dedoped from the EC material of the first color-development layer 30 through the electrolyte layer 31, and thereby color development/disappearance is repeated. Specifically, when anions are doped by applying a voltage, the EC material is oxidized. Further, a voltage is applied in the reverse direction, the doped anions are dedoped, and thereby the oxidized EC material is reduced. In this manner, reversible oxidation-reduction reactions occur, and resultant color development/disappearance occurs. Since the EC material has a holding property, the color development/disappearance does not change even if the voltage is cut off. In this way, the color of the first color-development layer 30 can be changed on a pixel-by-pixel basis, and thus changing the displayed image. That is, the displayed image can be changed by independently driving each pixel that is painted with a different one of C, M and Y.

Specifically, light that externally entered the EC display element passes though the first color-development layer 30 and is reflected on the second substrate 20 side. Then, the reflected light passes through the first color-development layer 30 and exits from the viewing side. As a result of the light passing through the first color-development layer 30 and exiting from the viewing side, the color of the first color-development layer 30 is displayed. For example, when C, M and Y of the first color-development layer 30 develop colors by doping or dedoping, they are mixed and black is thereby displayed. Further, for example, when C, M and Y of the first color-development layer 30 erase their colors by applying a voltage in the reverse direction, white background color or the like is displayed. In this way, a desired image can be displayed by oxidizing/reducing the first color-development layer 30 on a pixel-by-pixel basis and thereby changing colors of the pixels arranged in a matrix pattern on a pixel-by-pixel basis.

In an EC display element like the one described above, a π-electron based conjugated polymer derived from a π-electron based conjugated monomer is used for the first color-development layer 30. In such a case, since a π-electron based conjugated polymer can be formed into a film by electrochemically polymerization, a fine film can be obtained. In this way, an EC display element capable of eliminating unevenness in color development in the EC display element, achieving excellent contrast, resolution, and high color-developing efficiency, and having excellent display characteristics can be obtained.

Next, a manufacturing method of the above-described EC display element is explained hereinafter. Firstly, a manufacturing method of the first substrate 10 side is explained with reference to FIGS. 9A to 9D. FIGS. 9A to 9D are schematic cross-sections showing a manufacturing method of a first substrate 10 shown in FIGS. 3A to 3D. In FIGS. 9A to 9D, the figures on the left side correspond to the schematic crosswise cross-section shown in FIG. 3B, and the figures on the right side correspond to the schematic lengthwise cross-section shown in FIG. 3C.

Figure 9A:
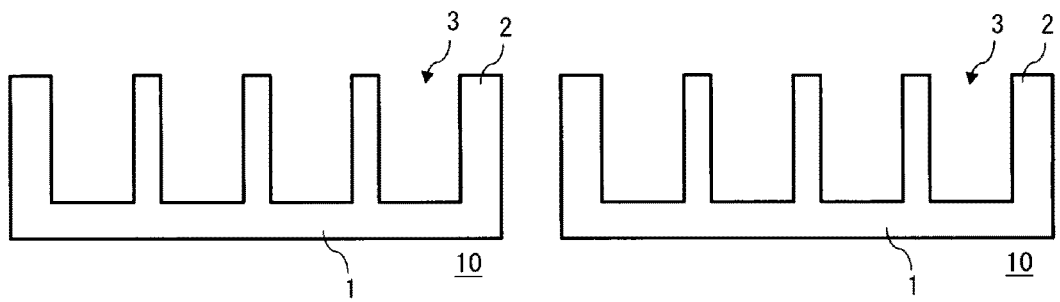
FIG. 9A is a schematic cross-section showing a manufacturing method of a first substrate in accordance with an exemplary embodiment.
Figure 9B:
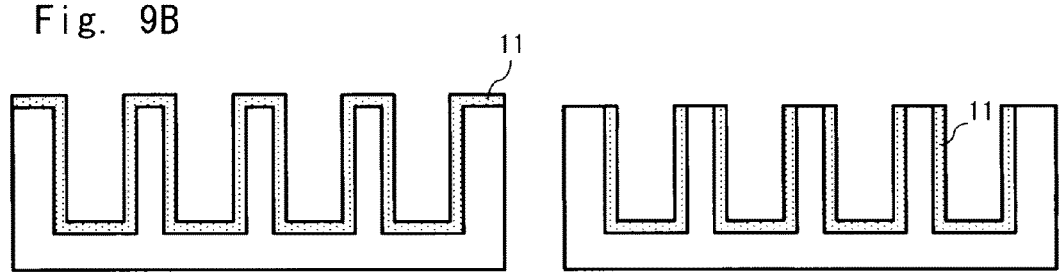
FIG. 9B is a schematic cross-section showing a manufacturing method of a first substrate in accordance with an exemplary embodiment.
Figure 9C:
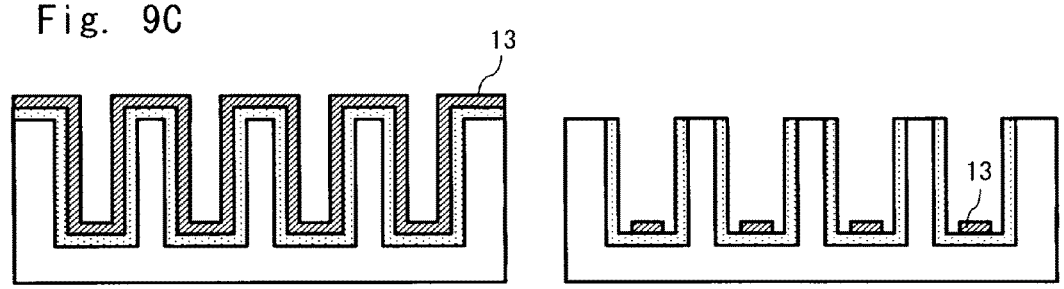
FIG. 9C is a schematic cross-section showing a manufacturing method of a first substrate in accordance with an exemplary embodiment.

Firstly, a first substrate 10 including dividing walls 2 are prepared. Further, the first substrate 10 includes a plurality of concave portions 3 each surrounded by dividing walls 2. As described above, the first substrate 10 may be prepared by integrally forming the base-material 1 and the dividing walls 2, or by separately forming the dividing walls 2 on the base-material 1. As a result, a structure shown in FIG. 9A is obtained. Next, a first conductive layer 11 is formed on the first substrate 10. In particular, a plurality of line-shaped first conductive layers 11 are formed so as to cover the concave portions 3. That is, the first conductive layer 11 is formed so as to connect a base-material top area 6 to no more than two adjacent base-material top areas 6.

Further, publicly-known techniques may be applied as a method of stacking the first conductive layer 11, though it is not limited to those techniques. Examples of the technique include wet coating such as vapor deposition, spin coating, slit coating, knife coating, lip coating, die coating, dip coating, spray coating, screen printing, ink-jet printing, flexographic printing and gravure printing, vapor deposition, sputtering, and dry coating while using a solvent containing metal and metal oxide, conductive carbide, conductive polymer, or the like as ink. Note that in this example, it is formed by a technique such as screen printing. Therefore, the first conductive layer 11 is also formed in the dividing wall side areas 5. With the process described above, a structure shown in FIG. 9B is obtained.

Next, a second conductive layer 13 is formed on the first conductive layer 11. In particular, a plurality of line-shaped second conductive layers 13 are formed over a plurality of base-material top areas 6 on which the first conductive layers 11 was formed. That is, the second conductive layer 13 is formed so as to connect no more than two adjacent base-material top areas 6. In other words, display electrodes in adjacent base-material top areas 6 are electrically connected in a predetermined direction by an electrical line. With regard to the material constituting the second conductive layer 13 and the technique for stacking the second conductive layer 13, publicly-known techniques may be used as in the case of the first conductive layer 11, though it is not limited to those techniques. With the process described above, a structure shown in FIG. 9C is obtained.

Then, in the dividing wall top area 4, an insulating layer 14 is formed on the second conductive layer 13 or on the dividing wall 2. The insulating layer 14 is provided for the purpose of preventing the second conductive layer 13 on the first substrate 10 from contacting to the conductive material on the second substrate 20, e.g., the third conductive layer 21 and the white-color layer 22. That is, it is provided for the purpose of preventing electrodes from contacting to each other in the EC element circuit and thus from being short-circuited. With regard to the material constituting the insulating layer 14 and the technique for stacking the insulating layer 14, publicly-known techniques may be applied, though it is not limited to those techniques.

Figure 9D:
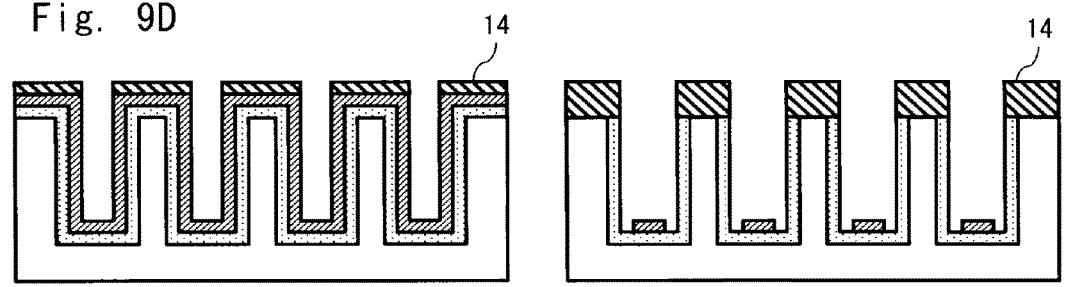
FIG. 9D is a schematic cross-section showing a manufacturing method of a first substrate in accordance with an exemplary embodiment.

Further, in order to form the insulating layer 14 speedily, it is preferably formed by wet coating such as vapor deposition, spin coating, slit coating, knife coating, lip coating, die coating, dip coating, spray coating, screen printing, ink-jet printing, flexographic printing and gravure printing while using at least one of a photo-curable resin, a thermo-setting resin, and a thermoplastic elastomer, or a solution containing it. When a photo-curable resin is contained, a curing process by ultraviolet irradiation is required after the wet coating process. When a thermo-setting resin is contained, a curing process by heat treatment is required after the wet coating process. Further, when a thermoplastic elastomer is contained, a drying process is required after the wet coating process. With the process described above, the insulating layer 14 is formed and a structure shown in FIG. 9D is obtained.

Figure 10A:
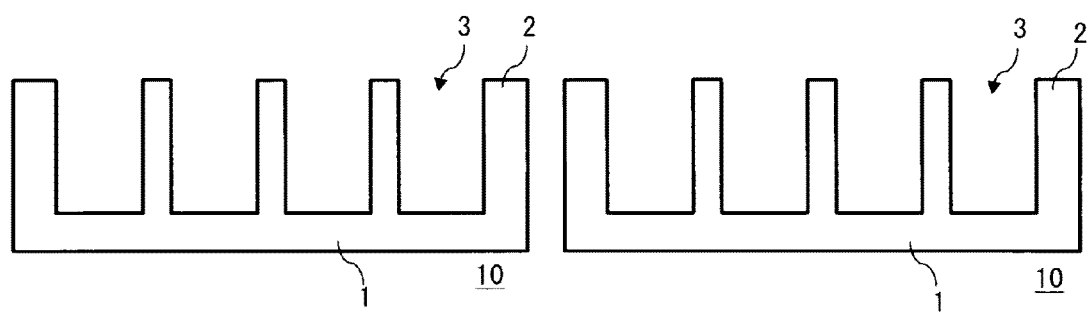
FIG. 10A is a schematic cross-section showing another manufacturing method of a first substrate on which display electrodes are formed in accordance with an exemplary embodiment.
Figure 10B:
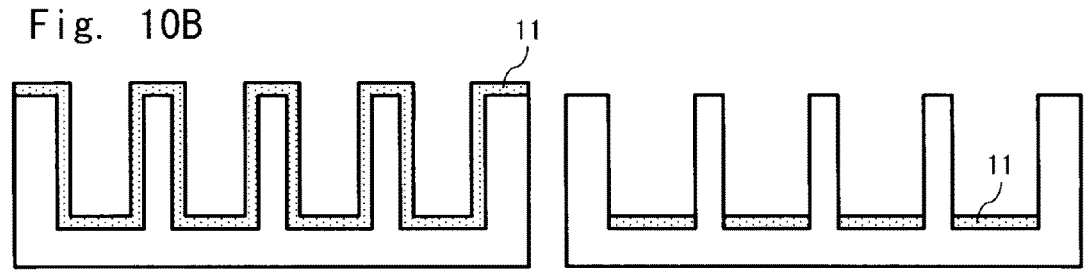
FIG. 10B is a schematic cross-section showing another manufacturing method of a first substrate on which display electrodes are formed in accordance with an exemplary embodiment.
Figure 10C:
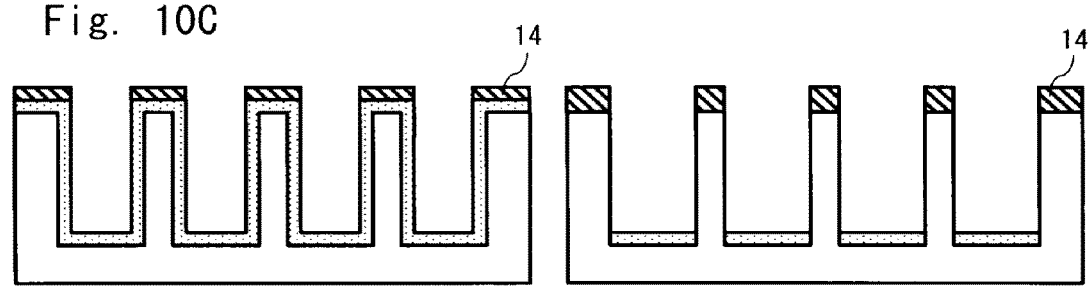
FIG. 10C is a schematic cross-section showing another manufacturing method of a first substrate on which display electrodes are formed in accordance with an exemplary embodiment.

Next, another manufacturing method of the first substrate 10 side is explained with reference to FIGS. 10A to 10C. FIGS. 10A to 10O are schematic cross-sections showing a manufacturing method of a first substrate 10 shown in FIGS. 4A to 4D. In FIGS. 10A to 10D, the figures on the left side correspond to the schematic crosswise cross-section shown in FIG. 4B, and the figures on the right side correspond to the schematic lengthwise cross-section shown in FIG. 4C. Note that in the following explanation of a manufacturing method of the first substrate 10 side, the part of the manufacturing method common to the above example is briefly explained.

Firstly, similarly to the above example, a first substrate 10 including dividing walls 2 are prepared as shown in FIG. 10A. Next, a first conductive layer 11 is formed on the first substrate 10. In particular, a plurality of line-shaped first conductive layers 11 are formed so as to cover the base-material top areas 6. That is, the first conductive layer 11 is formed so as to connect no more than two adjacent base-material top areas 6. Note that in this example, the first conductive layer 11 is formed by on-demand advanced printing such as ink-jet printing. Therefore, the first conductive layer 11 can be formed such that the first conductive layer 11 covers at least the base-material top areas 6 but does not cover the concave portions 3. Needless to say, the first substrate 10 may be also formed by using other techniques as mentioned above. With the process described above, a structure shown in FIG. 10B is obtained.

Then, in the dividing wall top area 4, an insulating layer 14 is formed on the first conductive layer 11 or on the dividing wall 2. In this way, the first substrate 10 on which display electrodes are formed is formed as shown in FIG. 10O.

Next, a manufacturing method of the above-described second substrate 20 side is explained hereinafter. Needless to say, various structures can be applied as shown in FIGS. 5A to 5F. Then, layers are successively formed in the order of second substrate 20—third conductive layer 21, second substrate 20—third conductive layer 21—white-color layer 22, second substrate 20—third conductive layer 21—second color-development layer 23, second substrate 20—third conductive layer 21—second color-development layer 23—white-color layer 22, second substrate 20—white-color layer 22, second substrate 20—white-color layer 22—second color-development layer 23, or a similar order. In this manner, the second substrate 20 on which opposed electrodes are formed is manufactured.

Publicly-known techniques may be applied as a method of stacking the third conductive layer 21, though it is not limited to those techniques. Examples of the technique include wet coating such as vapor deposition, spin coating, slit coating, knife coating, lip coating, die coating, dip coating, spray coating, screen printing, ink-jet printing, flexographic printing and gravure printing, vapor deposition, sputtering, and dry coating while using a solvent containing metal and metal oxide, conductive carbide, conductive polymer, and the like as ink.

Publicly-known techniques may be applied as a method of stacking the white-color layer 22, though it is not limited to those techniques. Examples of the technique include wet coating such as vapor deposition, spin coating, slit coating, knife coating, lip coating, die coating, dip coating, spray coating, screen printing, ink-jet printing, flexographic printing and gravure printing, vapor deposition, sputtering, and dry coating.

Publicly-known techniques may be applied as a method of stacking the second color-development layer 23, though it is not limited to those techniques. For example, the second color-development layer 23 can be formed by wet coating such as vapor deposition, spin coating, slit coating, knife coating, lip coating, die coating, dip coating, spray coating, screen printing, ink-jet printing, flexographic printing and gravure printing, vapor deposition, sputtering, dry coating, or the like while using a solvent containing any material including inorganic materials, organic materials, and organic-inorganic composite materials that exhibit electrochromic causing a color change by oxidation or reduction is used as ink. Further, if a π-electron based conjugated polymer is used as the material of the second color-development layer 23, the second color-development layer 23 can be formed by a technique such as electrochemically polymerization and a Langmuir-Blodgett (LB) method.

Then, display electrodes of the first substrate 10 and opposed electrodes of the second substrate 20 manufactured in the manner described above are disposed opposite to each other with a monomer-containing electrolyte layer interposed therebetween. That is, the space between the display electrodes and the opposed electrodes is filled with a monomer-containing electrolyte layer. Further, examples of a technique to form the monomer-containing electrolyte layer within the dividing walls 2, i.e., in the concave portions 3 include wet coating such as slit coating, knife coating, lip coating, die coating, dip coating, screen printing, ink-jet printing, flexographic printing and gravure printing The monomer-containing electrolyte layer forms a first color-development layer 30 and an electrolyte layer 31. The monomer-containing electrolyte layer includes at least one type of π-electron based conjugated monomer and an electrolyte in order to form a first color-development layer 30.

Next, a first color-development layer 30 and an electrolyte layer 31 are formed between the display electrodes and the opposed electrodes. In this example, a π-electron based conjugated polymer film is selectively formed in the display electrode by applying a voltage to the display electrode and the opposed electrode and thereby electrochemically polymerizing (electrolyticly polymerizing) the π-electron based conjugated monomer. For example, in the case of manufacturing an EC display element shown in FIG. 7, the first color-development layer 30 and the electrolyte layer 31 are formed by forming a π-electron based conjugated polymer film on the display electrode, i.e., on the first conductive layer 11 and the second conductive layer 13. In this process, the decision on which of the forward/reverse voltages is applied to the display electrode and the opposed electrode may be determined by taking the type of π-electron based conjugated monomer to be used and the electrode for which a film is to be formed into consideration. Specifically, a voltage is applied to the display electrode and the opposed electrode that sandwich the monomer-containing electrolyte layer therebetween. In this way, the give-and-receive of electrons occurs between a π-electron based conjugated monomer of the monomer-containing electrolyte layer and the display electrode, and thereby starting the polymerization reaction. Then, a π-electron based conjugated polymer is precipitated on the display electrode, and thereby forming a first color-development layer 30 including a π-electron based conjugated film. Further, a π-electron based conjugated polymer is precipitated, and the remaining monomer-containing electrolyte layer becomes an electrolyte layer 31. Note that, after the first color-development layer 30 and the electrolyte layer 31 are formed, if necessary, the unreacted π-electron based conjugated monomer may be deactivated by ultraviolet irradiation or heat treatment. In this way, the precipitation of a π-electron based conjugated polymer on the opposed electrode that would otherwise occur whenever color development/disappearance is repeated by application of a forward/reverse voltage can be suppressed.

Further, the time during which the voltage is applied may be determined such that the voltage application is continued for sufficient time or so after the current value was settled, though this does not always hold true because the necessary time varies according to the conductivity of the conductive layer to be used, the type of the π-electron based conjugated monomer, the type of the electrolyte, and the like. Anyway, the current value, the current density, and the like, as well as the applied voltage should be measured for this purpose. Alternatively, in the case where coloring can be observed as the film formation advances by the electrochemically polymerization, the color change may be measured by a spectrophotometer. By doing so, the time during which the voltage is applied may be determined such that the voltage application is continued for sufficient time or so after the absorbance is settled. In this way, it can be determined that the polymerization reaction has finished. With the process described above, a first color-development layer 30 and an electrolyte layer 31 are formed and an EC display element is thereby manufactured.

In accordance with the above-described manufacturing method of an EC display element, display electrodes, electrical lines, and the likes are formed on the first substrate 10 having dividing walls 2. Therefore, an EC display element can be created without requiring going through complicated processes such as preparing a substrate on which a conductive layer is formed in advance, etching the conductive layer, and providing dividing walls on it by a technique such as photolithography. Therefore, an EC display element having an excellent productivity can be manufactured with ease.

Further, since the π-electron based conjugated monomer is electrochemically polymerized after the EC display element is assembled, it is unnecessary to separately prepare a substrate on which a π-electron based conjugated polymer film was formed. In this way, the productivity of the EC display element is further improved. Further, since the amount of the π-electron based conjugated monomer to be used, which is expensive, can be reduced, reduction in costs can be achieved. Furthermore, since a fine film is formed by electrochemically polymerization, elimination of unevenness in color development, and excellent contrast, resolution, and high color-developing efficiency can be achieved.

Note that although the first color-development layer 30 that includes a π-electron based conjugated polymer film in the display electrode is formed by electrochemically polymerization in the above-described manufacturing method, the present invention is not limited to this manufacturing method. For example, a first color-development layer 30 may be formed on the display electrode by using a similar method to that of the above-described second color-development layer 23 before the display electrodes and the opposed electrodes are disposed opposite to each other. Then, a second color-development layer 23 and an electrolyte layer 31 may be formed between the display electrodes and the opposed electrodes by electrochemically polymerization. Further, the first color-development layer 30 and the second color-development layer 23 may be formed simultaneously by electrochemically polymerization. As described above, a color-development layer including a π-electron based conjugated polymer film derived from a π-electron based conjugated monomer may be selectively formed in at least one of the display electrode and the opposed electrode. Further, in the case where the first color-development layer 30 and the second color-development layer 23 are formed simultaneously, the monomer-containing electrolyte layer may include two types of π-electron based conjugated monomers. Further, examples of their combination include a combination of a p-type of the type that undergoes oxidative polymerization and an n-type of the type that undergoes reductive polymerization, and a combination of p-types or n-types of two different types having different polymerization potentials.

EXAMPLES

The present invention is further explained in more detailed manner with manufacturing examples and practical examples. However, the present invention is not limited to those practical examples.

[Used Sample]
pyrrole (Wako Pure Chemical)
aniline (Wako Pure Chemical)
3-methylthiophene (Wako Pure Chemical)
2,5-dichlorobenzonitrile (Wako Pure Chemical)
butylmethylimidazolium tetrafluoroborate (BMIM-BF$_4$) (Wako Pure Chemical)
acetonitrile (ACN) (Wako Pure Chemical)
tetrahydrofuran (THF) (Wako Pure Chemical)
tetrabutyl ammonium hexafluorophosphate (TBA-PF$_6$) (Wako Pure Chemical)
ammonium hexafluorophosphate (NH$_4$PF$_6$) (Wako Pure Chemical) p-toluenesulfonic acid (Wako Pure Chemical)
ITO dispersion liquid (SUFP-HX: manufactured by Sumitomo Metal Mining)
ITO dispersion liquid (SC-K2: manufactured by Sumitomo Metal Mining)
titanium oxide (EC-700: manufactured by Titan Kogyo)
PEDOT/PSS dispersion liquid (Baytron P HC V4: manufactured by TA Chemical)
ITO glass substrate (manufactured by GEOMATEC)
styrene-ethylene/polypropylene-styrene block copolymer (S2002: styrene based thermoplastic elastomer "SEPTON" (registered trademark) manufactured by KURARAY)
polyaniline dispersion liquid (dispersion liquid of 5 wt % polyaniline sulfonic acid and 95 wt % pure water)

[Manufacture of First Substrate 10 Having Dividing Wall 2]
(i) Manufacture of First Substrate "a"
Firstly, a stamper in which convex portions each having a size of 10 mm×10 mm and a height of 40 µm were arranged in a square matrix such that adjacent convex portions are separated from each other by 10 mm were filled with a photo-curable resin. Then, dividing walls 2 were formed on a polycarbonate film (200 µm in thickness: manufactured by TEISIN Chemicals) by curing the filled photo-curable resin with ultraviolet rays. The resultant substrate was used as a first substrate "a".

(ii) Manufacture of First Substrate "b"
A stamper in which convex portions each having a size of 200 µm×200 µm and a height of 20 µm were arranged in a square matrix such that adjacent convex portions are separated from each other by 100 µm were filled with a photo-curable resin. Then, dividing walls 2 were formed on a polycarbonate film (200 µm in thickness: manufactured by TEISIN Chemicals) by curing the filled photo-curable resin with ultraviolet rays. The resultant substrate was used as a first substrate "b".

(iii) Manufacture of First Substrate "c"
A stamper in which convex portions each having a size of 100 µm×100 µm and a height of 20 µm were arranged in a square matrix such that adjacent convex portions are separated from each other by 50 µm were filled with a photo-curable resin. Then, dividing walls 2 were formed on a polycarbonate film (200 µm in thickness: manufactured by TEISIN Chemicals) by curing the filled photo-curable resin with ultraviolet rays. The resultant substrate was used as a first substrate "c".

(iv) Manufacture of First Substrate "d"
A stamper in which convex portions each having a regular-hexagonal shape with each side being 200 µm and height being 20 µm were arranged in a hexagonal close-packed pattern such that adjacent convex portions are separated from each other by 100 µm were filled with a photo-curable resin. Then, dividing walls 2 were formed on a polycarbonate film (200 µm in thickness: manufactured by TEISIN Chemicals) by curing the filled photo-curable resin with ultraviolet rays. The resultant substrate was used as a first substrate "d".

(v) Manufacture of First Substrate "e"
A stamper in which convex portions each having a regular-hexagonal shape with each side being 100 µm and height being 20 µm were arranged in a hexagonal close-packed pattern such that adjacent convex portions are separated from each other by 50 µm were filled with a photo-curable resin. Then, dividing walls 2 were formed on a polycarbonate film (200 μm in thickness: manufactured by TEISIN Chemicals) by curing the filled photo-curable resin with ultraviolet rays. The resultant substrate was used as a first substrate "e".

(vi) Manufacture of First Substrate "f"

A stamper in which convex portions each having a size of 10 mm×10 mm and a height of 40 μm were arranged in a square matrix such that adjacent convex portions are separated from each other by 10 mm were filled with a photo-curable resin. Then, dividing walls 2 were formed on a glass substrate by curing the filled photo-curable resin with ultraviolet rays. The resultant substrate was used as a first substrate "f".

[Manufacture of Antireflection Structure (Moth-Eye Structure) on Rear Surface of First Substrate 10]

(i) Manufacture of Antireflection Structure on First Substrate Rear Surface A

A stamper in which cone-like shapes each having a bottom diameter of 230 nm and a depth of 230 nm are arranged in a close-packed pattern with a 230 nm pitch is filled with a photo-curable resin. Then, an antireflection structure was formed on a polycarbonate film (200 μm in thickness: manufactured by TEISIN Chemicals) by curing the filled photo-curable resin with ultraviolet rays. A first substrate rear surface A was obtained by bonding the polycarbonate film on which this antireflection structure was formed and the above-described first substrate 10 having dividing walls 2 on their rear surfaces by ultraviolet curing of a photo-curable resin.

(ii) Manufacture of Antireflection Structure on First Substrate Rear Surface B

A stamper in which cone-like shapes each having a bottom diameter of 150 nm and a depth of 150 nm are arranged in a close-packed pattern with a 250 nm pitch is filled with a photo-curable resin. Then, an antireflection structure was formed on a polycarbonate film (200 μm in thickness: manufactured by TEISIN Chemicals) by curing the filled photo-curable resin with ultraviolet rays. A first substrate rear surface B was obtained by bonding the polycarbonate film on which this antireflection structure was formed and the above-described first substrate 10 having dividing walls 2 on their rear surfaces by ultraviolet curing of a photo-curable resin.

[Formation of First Conductive Layer 11]

A first conductive layer 11 was stacked on the above-described first substrates "a" to "f" by screen printing or ink-jet printing using a ITO dispersion liquid (SUFP-HX: manufactured by Sumitomo Metal Mining) or a PEDOT/PSS dispersion liquid such that the first conductive layer 11 is stacked on base-material top areas 6 and connects no more than two adjacent base-material top areas 6.

[Formation of Second Conductive Layer 13]

A second conductive layer 13 was stacked on the first substrate 10 on which the above-described first conductive layer 11 was formed by screen printing or ink-jet printing using a ITO dispersion liquid (SUFP-HX: manufactured by Sumitomo Metal Mining) or a PEDOT/PSS dispersion liquid such that the second conductive layer 13 is stacked on the first conductive layer 11 and connects no more than two adjacent base-material top areas 6 on which the first conductive layer 11 was formed.

[Formation of Insulating Layer 14]

On the first substrate 10 on which the above-described second conductive layer 13 was formed, an insulating layer 14 was stacked on the second conductive layer 13 or the dividing walls 2 by screen printing by ultraviolet curing of a photo-curable resin. Note that in this process, the ultraviolet curing was not complete curing, but was adjusted to semi-curing so as to have adhesiveness.

[Manufacture of Second Substrate with Electrode]

A second substrate with electrodes was formed by stacking a third conductive layer 21, a second color-development layer 23, or a white-color layer 22 on the second substrate 20. There was six different orders in which these layers were stacked, i.e., the orders of second substrate 20—third conductive layer 21, second substrate 20—third conductive layer 21—white-color layer 22, second substrate 20—third conductive layer 21—second color-development layer 23, second substrate 20—third conductive layer 21—second color-development layer 23—white-color layer 22, second substrate 20—white-color layer 22, and second substrate 20—white-color layer 22—second color-development layer 23. A polycarbonate film (200 μm in thickness: manufactured by TEISIN Chemicals) or a glass substrate was used for the second substrate 20; an ITO dispersion liquid (SUFP-HX: manufactured by Sumitomo Metal Mining) or a PEDOT/PSS dispersion liquid was used for the third conductive layer 21; a polyaniline dispersion liquid was used for the second color-development layer 23; and an ITO dispersion liquid (SC-K2: manufactured by Sumitomo Metal Mining) or a titanium oxide (EC-700: manufactured by Titan Kogyo, a dispersion liquid of 20 wt % pure water) was used for the white-color layer 22. With regard to the stacking method of these layers, screen printing or ink-jet printing was adopted.

Table 1 shows constituents of the first substrates with electrodes on which display electrodes and the likes were formed on the first substrates 10. Note that the abbreviations "Scr" and "Ij" in Table 1 stand for screen printing and ink-jet printing respectively. Further, Table 2 shows constituents of the second substrates with electrodes on which opposed electrodes and the likes were formed on the second substrates 20. Note that the abbreviations "PC", "Glass", "white ITO", "$TiO_x$", "PANI", "Scr", and "Ij" in Table 2 stand for polycarbonate film, glass substrate, ITO dispersion liquid (SC-K2: manufactured by Sumitomo Metal Mining), titanium oxide (EC-700: manufactured by Titan Kogyo, a dispersion liquid of 20 wt % pure water), polyaniline dispersion liquid, screen printing, and ink-jet printing respectively.

TABLE 1

| First substrate with electrode No. | First substrate No. | First substrate rear surface No. | First conductive layer Constituent material | First conductive layer Stacking method | Second conductive layer Constituent material | Second conductive layer Stacking method | Insulating layer Constituent material | Insulating layer Stacking method |
|---|---|---|---|---|---|---|---|---|
| 1 | a | A | ITO | Scr | ITO | IJ | Photo curable resin | Scr |
| 2 | a | A | PEDOT-PSS | Scr | PEDOT-PSS | IJ | Photo curable resin | Scr |

TABLE 1-continued

| First substrate with electrode No. | First substrate No. | First substrate rear surface No. | First conductive layer Constituent material | First conductive layer Stacking method | Second conductive layer Constituent material | Second conductive layer Stacking method | Insulating layer Constituent material | Insulating layer Stacking method |
|---|---|---|---|---|---|---|---|---|
| 3 | a | B | ITO | Scr | ITO | Scr | Photo curable resin | Scr |
| 4 | b | A | ITO | Scr | ITO | IJ | Photo curable resin | Scr |
| 5 | c | A | ITO | Scr | ITO | IJ | Photo curable resin | Scr |
| 6 | d | A | ITO | Scr | ITO | IJ | Photo curable resin | Scr |
| 7 | e | A | ITO | Scr | ITO | IJ | Photo curable resin | Scr |
| 8 | f | A | ITO | Scr | ITO | IJ | Photo curable resin | Scr |
| 9 | a | A | ITO | IJ | — | — | — | — |

TABLE 2

| Second substrate with electrode No. | | | | |
|---|---|---|---|---|
| 3 Third conductive layer-second color development layer | 2 Third conductive layer-white color layer | 1 Third conductive layer | Constituent on second substrate | |
| PC | PC | PC | Second substrate constituent material | |
| ITO | ITO | ITO | Constituent material | Third conductive layer |
| IJ | IJ | IJ | Stacking method | |
| — | White ITO | — | Constituent material | White-color layer |
| — | Scr | — | Stacking method | |
| PANI | — | — | Constituent material | Second color-development layer |
| IJ | — | — | Stacking method | |

| 8 White color layer | 7 Third conductive layer | 6 White color layer-second color development layer | 5 White-color layer | 4 Third conductive layer-second color development layer-white color layer |
|---|---|---|---|---|
| Glass | Glass | PC | PC | PC |
| — | PEDOT-PSS | — | — | ITO |
| — | Scr | — | — | IJ |
| TiO$_x$ | — | White ITO | White ITO | White ITO |
| Scr | — | Scr | Scr | Scr |
| — | — | PANI | — | PANI |
| — | — | IJ | — | IJ |

Example 1

BMIM-BF$_4$ containing 0.01 [mol/l] pyrrhol was adjusted as material of a monomer-containing electrolyte layer. That is, pyrrhol was used as the π-electron based conjugated monomer, and MIM-BF$_4$, which was ionic liquid, was used as the electrolyte. By using ink-jet printing, 4 µl of BMIM-BF$_4$ solution containing 0.01 [mol/l] pyrrhol was injected within the concave portion 3 on the first substrate 1 with electrodes. Then, it was adhered by ultraviolet curing after bonded by using the second substrate 1 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of pyrrhol was thereby started. Then, it was left undisturbed until the current valued measured at the ammeter was settled, and the voltage application was continued additional 5 minutes after that. In this way, the polymerization reaction was finished, and the formation of a black polypyrrole film was observed on the anode. That is, it was confirmed that a first color-development layer 30 having a polypyrrole film as a π-electron based conjugated polymer film was formed. After the confirmation, when the forward/reverse voltages were reversed, the polypyrrole film on the anode immediately exhibited an electrochromic property and thus exhibiting a color change from violet to yellow. Finally, when the two substrates were removed to observe the cathode side, it was confirmed that no polypyrrole film was formed on the cathode side.

Example 2

A mixed liquid obtained by dissolving 0.05 [mol/l] aniline, 0.05 [mol/l] p-toluenesulfonic acid, and 0.1 [mol/l] $NH_4PF_6$ into distilled water was adjusted as material of a monomer-containing electrolyte layer. That is, aniline was used as the π-electron based conjugated monomer, and the $NH_4PF_6$ was used as supporting electrolyte. By using ink-jet printing, 4 μl of aqueous solution of 0.05 [mol/l] aniline/0.05 [mol/l] p-toluenesulfonic acid/0.1 [mol/l] $NH_4PF_6$ was injected within the concave portion 3 on the first substrate 1 with electrodes. Then, it was adhered by ultraviolet curing after bonded by using the second substrate 2 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of aniline was thereby started. Then, it was left undisturbed until the current valued measured at the ammeter was settled, and the voltage application was continued additional 15 minutes after that. In this way, the polymerization reaction was finished, and the formation of a violet polyaniline film was observed on the anode. That is, it was confirmed that a first color-development layer 30 having a polyaniline film as a π-electron based conjugated polymer film was formed. After the confirmation, when the forward/reverse voltages were reversed, the polyaniline film on the anode immediately exhibited an electrochromic property and thus exhibiting a color change from violet to yellow to green. Finally, when the two substrates were removed to observe the cathode side, it was confirmed that no polyaniline film was formed on the cathode side.

Example 3

A mixed liquid obtained by dissolving 0.005 [mol/l] 3-methylthiophene and 0.05 [mol/l] $TBA-PF_6$ into ACN was adjusted as material of a monomer-containing electrolyte layer. That 3-methylthiophene was used as the π-electron based conjugated monomer, and $TBA-PF_6$ was used as the supporting electrolyte. By using ink-jet printing, 4 μl of ACN solution of 0.005 [mol/l] 3-methylthiophene/0.05 [mol/l] $TBA-PF_6$ was injected within the concave portion 3 on the first substrate 2 with electrodes. Then, it was adhered by ultraviolet curing after bonded by using the second substrate 4 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of 3-methylthiophene was thereby started. Then, it was left undisturbed until the current valued measured at the ammeter was settled, and the voltage application was continued additional 15 minutes after that. In this way, the polymerization reaction was finished, and the formation of a red poly(3-methylthiophene) film was observed on the anode. That is, it was confirmed that a first color-development layer 30 having a poly(3-methylthiophene) film as a π-electron based conjugated polymer film was formed. After the confirmation, when the forward/reverse voltages were reversed, the poly(3-methylthiophene) film on the anode immediately exhibited an electrochromic property and thus exhibiting a color change from red to dark blue. Finally, when the two substrates were removed to observe the cathode side, it was confirmed that no poly(3-methylthiophene) film was formed on the cathode side.

Example 4

A mixed liquid obtained by dissolving 0.01 [mol/l] 2,5-dichlorobenzonitrile and 0.1 [mol/l] $TBA-PF_6$ into THF was adjusted as material of a monomer-containing electrolyte layer. That is, 2,5-dichlorobenzonitrile was used as the π-electron based conjugated monomer, and $TBA-PF_6$ was used as the supporting electrolyte. By using ink-jet printing, 4 μl of THF solution of 0.01 [mol/l] 2,5-dichlorobenzonitrile/0.1 [mol/l] $TBA-PF_6$ was injected within the concave portion 3 on the first substrate 8 with electrodes. Then, it was adhered by ultraviolet curing after bonded by using the second substrate 3 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of 2,5-dichlorobenzonitrile was thereby started. Then, it was left undisturbed until the current valued measured at the ammeter was settled, and the voltage application was continued additional 30 minutes after that. In this way, the polymerization reaction was finished, and the formation of a dark-brown poly(benzonitrile-2,5-diyl) film was observed on the cathode. That is, it was confirmed that a first color-development layer 30 having a poly(benzonitrile-2,5-diyl) film as a π-electron based conjugated polymer film was formed. After the confirmation, when the forward/reverse voltages were reversed, the poly(benzonitrile-2,5-diyl) film on the cathode immediately exhibited an electrochromic property and thus exhibiting a color change from dark brown to light brown. Finally, when the two substrates were removed to observe the anode side, it was confirmed that no poly(benzonitrile-2,5-diyl) film was formed on the anode side.

Example 5

$BMIM-BF_4$ containing 0.01 [mol/l] pyrrhol was adjusted as material of a monomer-containing electrolyte layer. That is, pyrrhol was used as the π-electron based conjugated monomer, and $MIM-BF_4$, which was ionic liquid, was used as the electrolyte. By using ink-jet printing, 4 μl of $BMIM-BF_4$ solution containing 0.01 [mol/l] pyrrhol was injected within the concave portion 3 on the first substrate 3 with electrodes. Then, it was adhered by ultraviolet curing after bonded by using the second substrate 5 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of pyrrhol was thereby started. Then, it was left undisturbed until the current valued measured at the ammeter was settled, and the voltage application was continued additional 5 minutes after that. In this way, the polymerization reaction was finished, and the formation of a black polypyrrole film was observed on the anode. That is, it was confirmed that a first color-development layer 30 having a polypyrrole film as a π-electron based conjugated polymer film was formed. After the confirmation, when the forward/ reverse voltages were reversed, the polypyrrole film on the anode immediately exhibited an electrochromic property and thus exhibiting a color change from violet to yellow. Finally, when the two substrates were removed to observe the cathode side, it was confirmed that no polypyrrole film was formed on the cathode side.

Example 6

BMIM-$BF_4$ containing 0.001 [mol/l] pyrrhol was adjusted as material of a monomer-containing electrolyte layer. That is, pyrrhol was used as the π-electron based conjugated monomer, and MIM-$BF_4$, which was ionic liquid, was used as the electrolyte. By using ink-jet printing, 4 μl of BMIM-$BF_4$ solution containing 0.001 [mol/l] pyrrhol was injected between the dividing walls on the first substrate 9 with electrodes. Then, it was adhered by ultraviolet curing after bonded by using the second substrate 6 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of pyrrhol was thereby started. Then, it was left undisturbed until the current valued measured at the ammeter was settled, and the voltage application was continued additional 5 minutes after that. In this way, the polymerization reaction was finished, and the formation of a black polypyrrole film was observed on the anode. That is, it was confirmed that a first color-development layer 30 having a polypyrrole film as a π-electron based conjugated polymer film was formed. After the confirmation, when the forward/reverse voltages were reversed, the polypyrrole film on the anode immediately exhibited an electrochromic property and thus exhibiting a color change from violet to yellow. Finally, when the two substrates were removed to observe the cathode side, it was confirmed that no polypyrrole film was formed on the cathode side.

Example 7

A mixed liquid obtained by dissolving 0.01 [mol/l] 3-methylthiophene and 0.1 [mol/l] TBA-$PF_6$ into ACN was adjusted as material of a monomer-containing electrolyte layer. That is, 3-methylthiophene was used as the π-electron based conjugated monomer, and TBA-$PF_6$ was used as the supporting electrolyte. By using ink-jet printing, 0.8 nl of ACN solution of 0.01 [mol/l] 3-methylthiophene/0.1 [mol/l] TBA-$PF_6$ was injected within the concave portion 3 on the first substrate 4 with electrodes. Then, it was adhered by ultraviolet curing after bonded by using the second substrate 7 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of 3-methylthiophene was thereby started. Then, it was left undisturbed until the current valued measured at the ammeter was settled, and the voltage application was continued additional 15 minutes after that. In this way, the polymerization reaction was finished, and the formation of a red poly(3-methylthiophene) film was observed on the anode. That is, it was confirmed that a first color-development layer 30 having a poly(3-methylthiophene) film as a π-electron based conjugated polymer film was formed. After the confirmation, when the forward/reverse voltages were reversed, the poly(3-methylthiophene) film on the anode immediately exhibited an electrochromic property and thus exhibiting a color change from red to dark blue. Finally, when the two substrates were removed to observe the cathode side, it was confirmed that no poly(3-methylthiophene) film was formed on the cathode side.

Example 8

A mixed liquid obtained by dissolving 0.05 [mol/l] aniline, 0.05 [mol/l] p-toluenesulfonic acid, and 0.1 [mol/l] $NH_4PF_6$ into distilled water was adjusted as material of a monomer-containing electrolyte layer. That is, aniline was used as the π-electron based conjugated monomer, and the $NH_4PF_6$ was used as supporting electrolyte. By using ink-jet printing, 0.2 nl of aqueous solution of 0.05 [mol/l] aniline/0.05 [mol/l] p-toluenesulfonic acid/0.1 [mol/l] $NH_4PF_6$ was injected within the concave portion 3 on the first substrate 5 with electrodes. Then, it was adhered by ultraviolet curing after bonded by using the second substrate 8 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of aniline was thereby started. Then, it was left undisturbed until the current valued measured at the ammeter was settled, and the voltage application was continued additional 15 minutes after that. In this way, the polymerization reaction was finished, and the formation of a violet polyaniline film was observed on the anode. That is, it was confirmed that a first color-development layer 30 having a polyaniline film as a π-electron based conjugated polymer film was formed. After the confirmation, when the forward/reverse voltages were reversed, the polyaniline film on the anode immediately exhibited an electrochromic property and thus exhibiting a color change from violet to yellow to green. Finally, when the two substrates were removed to observe the cathode side, it was confirmed that no polyaniline film was formed on the cathode side.

Example 9

BMIM-$BF_4$ containing 0.001 [mol/l] pyrrhol was adjusted as material of a monomer-containing electrolyte layer. That is, pyrrhol was used as the π-electron based conjugated monomer, and MIM-BF4, which was ionic liquid, was used as the electrolyte. By using ink-jet printing, 10 nl of BMIM-$BF_4$ solution containing 0.001 [mol/l] pyrrhol was injected within the concave portion 3 on the first substrate 6 with electrodes. Then, it was adhered by ultraviolet curing after bonded by using the second substrate 1 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of pyrrhol was thereby started. Then, it was left undisturbed until the current valued measured at the ammeter was settled, and the voltage application was continued additional 5 minutes after that. In this way, the polymerization reaction was finished, and the formation of a black polypyrrole film was observed on the anode. That is, it was confirmed that a first color-development layer 30 having a polypyrrole film as a π-electron based conjugated polymer film was formed. After the confirmation, when the forward/reverse voltages were reversed, the polypyrrole film on the anode immediately exhibited an electrochromic property and thus exhibiting a color change from violet to yellow. Finally, when the two substrates were removed to observe the cathode side, it was confirmed that no polypyrrole film was formed on the cathode side.

Example 10

BMIM-BF$_4$ containing 0.001 [mol/l] pyrrhol was adjusted as material of a monomer-containing electrolyte layer. That is, pyrrhol was used as the π-electron based conjugated monomer, and MIM-BF$_4$, which was ionic liquid, was used as the electrolyte. By using ink-jet printing, 5 nl of BMIM-BF$_4$ solution containing 0.001 [mol/l] pyrrhol was injected within the concave portion 3 on the first substrate 7 with electrodes. Then, it was adhered by ultraviolet curing after bonded by using the second substrate 1 with electrodes.

A 1.5V direct-current power supply and an ammeter were connected to electrodes formed on these two substrates so that a circuit was formed. By closing the circuit, forward/reverse voltages were applied to respective electrodes and the polymerization reaction of pyrrhol was thereby started. Then, it was left undisturbed until the current valued measured at the ammeter was settled, and the voltage application was continued additional 5 minutes after that. In this way, the polymerization reaction was finished, and the formation of a black polypyrrole film was observed on the anode. That is, it was confirmed that a first color-development layer 30 having a polypyrrole film as a π-electron based conjugated polymer film was formed. After the confirmation, when the forward/reverse voltages were reversed, the polypyrrole film on the anode immediately exhibited an electrochromic property and thus exhibiting a color change from violet to yellow. Finally, when the two substrates were removed to observe the cathode side, it was confirmed that no polypyrrole film was formed on the cathode side.

Comparative Example 1

Instead of the first substrate 1 with electrodes used in the above-describe Example 1, a first substrate 1-1 with electrodes on which a first conductive layer 11 connecting to all adjacent base-material top areas 6 was stacked was used. Note that except for this, a similar technique to that of Example 1 was used. In this case, passive type driving could not be performed, and unintended addressing and crosstalk (phenomenon in which a drive signal leaks into a portion that is not driven on the panel) were observed.

Comparative Example 2

Instead of the first substrate 1 with electrodes used in the above-describe Example 1, a first substrate 1-2 with electrodes on which a second conductive layer 13 that connects not only to no more than two adjacent base-material top areas 6 on which the first conductive layer 11 was formed but also to all adjacent base-material top areas 6 was stacked was used. Note that except for this, a similar technique to that of Example 1 was used. In this case, passive type driving could not be performed, and unintended addressing and crosstalk (phenomenon in which a drive signal leaks into a portion that is not driven on the panel) were observed.

Comparative Example 3

Instead of the first substrate 1 with electrodes used in the above-describe Example 1, a first substrate 1-3 with electrodes on which no insulating layer 14 was stacked was used. Note that except for this, a similar technique to that of Example 1 was used. In this case, any formation of a polypyrrole film on the anode could not be confirmed.

Comparative Example 4

A PEDOT film was formed by applying a coating of a PEDOT/PSS dispersion liquid on an ITO glass substrate and drying the solvent. That is, a first color-development layer having a PEDOT film as a π-electron based conjugated polymer film was formed on an ITO glass substrate. The resultant substrate was used as a first substrate 10 with electrodes. Then, 1 ml of mixed liquid obtained by dissolving 0.01 [mol/l] TBA-PF$_6$ into ACN was adjusted as material of an electrolyte layer 31. Next, a film that was obtained by hollowing an S2002 film having a size of 1 cm×1 cm and a thickness of 40 μm into a frame shape was used both as a spacer and an adhesive layer. Then, 30 μl of an ACN solution of 0.01 [mol/l] TBA-PF$_6$ was injected within the spacer and sandwiched between the first substrate 10 with electrodes and ITO. A 1.5V direct-current power supply and an ammeter were connected to these two ITOs so that a circuit was formed. When the circuit was closed, and the forward/reverse voltages were applied to the respective ITOs and then reversed, a PEDOT film on the first substrate 10 with electrodes exhibited an electrochromic property, and it took about one minute to complete a color change from dark blue to light blue.

Table 3 shows results of the above-described examples, and FIG. 4 shows results of the comparative examples.

TABLE 3

|  | First substrate with electrode No. | Second substrate with electrode No. | First color-development layer | Supporting electrolyte or ionic liquid |
|---|---|---|---|---|
| Example 1 | 1 | 1 | polypyrrole | BMIM-BF$_4$ |
| Example 2 | 1 | 2 | polyaniline | NH$_4$PF$_6$ |
| Example 3 | 2 | 4 | Poly(3-methyl-thiophene) | TBA-PF$_6$ |
| Example 4 | 8 | 3 | Poly(benzonitrile-2,5-diyl) | TBA-PF$_6$ |
| Example 5 | 3 | 5 | polypyrrole | BMIM-BF$_4$ |
| Example 6 | 9 | 6 | polypyrrole | BMIM-BF$_4$ |
| Example 7 | 4 | 7 | Poly(3-methyl-thiophene) | TBA-PF$_6$ |
| Example 8 | 5 | 8 | polyaniline | NH$_4$PF$_6$ |
| Example 9 | 6 | 1 | polypyrrole | BMIM-BF$_4$ |
| Example 10 | 7 | 1 | polypyrrole | BMIM-BF$_4$ |

TABLE 4

|  | First substrate with electrode No. | Structure |
|---|---|---|
| Comparative example 1 | 1-1 | First conductive layer connecting to all adjacent substrate top surface areas |
| Comparative example 2 | 1-2 | Second conductive layer connecting to all adjacent substrate top surface areas |
| Comparative example 3 | 1-3 | Insulating layer is omitted |
| Comparative example 4 | 10 | Film is formed by applying/drying method |

When at least one of the first conductive layer 11 and the second conductive layer 13 was formed so as to connect to all adjacent base-material top areas 6 as in the case of comparative examples 1 and 2, passive type driving could not be performed. This is because unintended addressing and crosstalk occur. Further, when no insulating layer 14 was stacked as in the case of the comparative example 3, the electrochemically polymerization reaction of the π-electron based conjugated monomer did not proceed. This is because the display electrode and the opposed electrode were short-circuited. Further, in the film forming method in which a coating of a liquid in which a π-electron based polymer was dissolved or dispersed to a high degree was applied and dried, it was difficult to form an excellent π-electron based polymer film, and as a result, the response of the EC display element becomes slow. By contrast, by adopting a structure in accordance with the present invention to the first conductive layer 11, the second conductive layer 13, and the insulating layer 14 as in the case of Examples 1 to 10, passive type driving could be performed. Further, by forming the first color-development layer 30 by electrochemically polymerization as in the case of Examples 1 to 10, a fine film could be obtained and an EC display element having excellent characteristics and quality could be obtained.

Industrial Applicability

The present invention can be used, for example, in electrochromic display devices including a substrate having a dividing wall and its manufacturing method.

The invention claimed is:

1. An electrochromic display device comprising:
a substrate comprising a dividing wall and a concave portion surrounded by the dividing wall;
a first electrode formed on a bottom surface of the concave portion;
an electrical line formed on the dividing wall to electrically connect the first electrodes within adjacent concave portions to each other in a predetermined direction;
a second electrode disposed opposite to the first electrode;
a first color-development layer, a second color-development layer, and an electrolyte layer formed between the first and second electrodes; and
an insulating layer formed on the electrical line on the dividing wall,
wherein
the first and/or second color-development layer includes a π-electron based conjugated polymer film derived from a π-electron based conjugated monomer, and
the π-electron based conjugated monomer includes at least one compound selected from a group consisting of:
aniline;
a π-electron based conjugated monomer having a structure capable of introducing boron in a principal chain;
a π-electron based conjugated monomer in which part of carbon of an aromatic ring is replaced by oxygen and which is typified by pyran;
a benzene derivative selected from a group consisting of 2,3-dialkyl phenyl, 2,5-dialkyl phenyl, 2,3,5,6-tetraalkyl phenyl, 2,3-alkoxy phenyl, 2,5-alkoxy phenyl, 2,3,5,6-tetraalkoxy phenyl, 2-(N,N,-dialkyl amino)phenyl, 2,5-di(N,N,-dialkyl amino)phenyl, 2,3-di(N,N,-dialkyl amino)phenyl, p-phenylene oxide, p-phenylene sulfide, p-phenylene amino, p-phenylene vinylene, and fluorene;
an acene derivative selected from a group consisting of naphthalene, anthracene, tetracene, pentacene, hexacene, heptacene, naphthylene vinylene, peri-naphthalene, amino pyrene, and phenanthrene;
a carbazole derivative including N-alkyl carbazole;
a pyridine derivative selected from a group consisting of pyrimidine, pyridazine, triazine, pyrazine, chinoline, and purine;
a furan derivative including 3-alkyl furan;
a pyrrole derivative selected from a group consisting of N-alkyl pyrrole, ethylene-3,4-dioxy pyrrole, and propylene-3,4-dioxy pyrrole;
a thiophene derivative selected from a group consisting of thiophene vinylene, alkyl thiophene, ethylene-3,4-dioxy thiophene, propylene-3,4-dioxy thiophene, thienothiophene, thienofuran, thienopyrazine, and isothianaphthene; and
a π-electron based conjugated compound selected from a group consisting of acetylene, oxadiazole, thiazyl, selenophene, tellurophene, imidazole, oxazole, thiazole, pyrazole, isoxazole, isothiazole, benzotriazole, pyran, benzothiadiazole, and benzooxadiazole.

2. The electrochromic display device according to claim 1, further comprising the second color-development layer disposed opposite to the first color-development layer through the electrolyte layer between the first and second electrodes.

3. The electrochromic display element according claim 2, wherein the first electrode has total light transmittance of 70% or higher.

4. The electrochromic display element according to claim 2, wherein the insulating layer includes at least one selected from a group consisting of a photo-curable resin, a thermosetting resin, and a thermoplastic elastomer.

5. The electrochromic display element according to claim 2, wherein the insulating layer is black.

6. The electrochromic display element according to claim 2, wherein the substrate is made of at least one flexible material selected from a group consisting of polystyrene, polyacrylate, polycarbonate, a styrene-acrylate copolymer, a cycloolefin polymer, polylactic acid, polyethylene terephthalate, polyethylene naphthalate, and their derivatives.

7. The electrochromic display element according to claim 2, wherein the electrolyte layer includes an ionic liquid.

8. The electrochromic display element according to claim 2, further comprising an antireflection structure on a rear surface of the first substrate.

9. The electrochromic display element according to claim 2, wherein
a size of a bottom surface of each of the concave portions is $10^2$ to $5 \times 10^5$ μm$^2$,
a distance of the bottom surface, when measured from edge to edge for each of the bottom surfaces, is 15 to 450 μm,
a height of the dividing wall is 3 to 100 μm, and
a ratio of the bottom surface to the dividing wall is 0.05 to 100.

10. The electrochromic display device according to claim 1, wherein the first electrode has total light transmittance of 70% or higher.

11. The electrochromic display device according to claim 1, wherein the insulating layer includes at least one selected from a group consisting of a photo-curable resin, a thermosetting resin, and a thermoplastic elastomer.

12. The electrochromic display device according to claim 1, wherein the insulating layer is black.

13. The electrochromic display device according to claim 1, wherein the substrate is made of at least one flexible material selected from a group consisting of polystyrene, polyacrylate, polycarbonate, a styrene-acrylate copolymer, a cycloolefin polymer, polylactic acid, polyethylene terephthalate, polyethylene naphthalate, and their derivatives.

14. The electrochromic display device according to claim 1, wherein the electrolyte layer includes an ionic liquid.

15. The electrochromic display device according to claim 1, further comprising an antireflection structure on a rear surface of the substrate.

16. The electrochromic display device according to claim 1, wherein
- a size of a bottom surface of each of the concave portions is $10^2$ to $5\times10^5$ µm$^2$,
- a distance of the bottom surface, when measured from edge to edge for each of the bottom surfaces, is 15 to 450 µm,
- a height of the dividing wall is 3 to 100 µm, and
- a ratio of the bottom surface to the dividing wall is 0.05 to 100.

17. A method of manufacturing an electrochromic display device comprising:
- forming a substrate comprising a dividing wall and a concave portion surrounded by the dividing wall;
- forming a first electrode on a bottom surface of the concave portion;
- disposing a second electrode so as to be opposed to the first electrode;
- forming a color-development layer and an electrolyte layer between the first and second electrodes,
- wherein the first electrodes within adjacent concave portions are electrically connected in a predetermined direction; and
- further comprising, before the forming the color-development layer and the electrolyte layer, forming a monomer-containing electrolyte layer including a π-electron based conjugated monomer and an electrolyte between the first and second electrodes,
- wherein the color-development layer that selectively includes a π-electron based conjugated polymer film in the first and/or second electrode is formed by applying a voltage to the first and second electrodes and thereby electrochemically polymerizing a π-electron based conjugated monomer.

* * * * *